United States Patent
Wortman et al.

(10) Patent No.: US 11,808,461 B2
(45) Date of Patent: Nov. 7, 2023

(54) RADIANT HEATER ASSEMBLY

(71) Applicant: Detroit Radiant Products Company, Warren, MI (US)

(72) Inventors: Joseph A Wortman, Grosse Pointe Farms, MI (US); Kevin L. Blissett, Lenox, MI (US); Kenneth L. Bachorski, Warren, MI (US); Alex P. Napolitan, Fort Gratiot, MI (US)

(73) Assignee: Detroit Radiant Products Company, Warren, MI (US)

( * ) Notice: Subject to any disclaimer, the term of this patent is extended or adjusted under 35 U.S.C. 154(b) by 289 days.

(21) Appl. No.: 17/128,821

(22) Filed: Dec. 21, 2020

(65) Prior Publication Data

US 2021/0190322 A1   Jun. 24, 2021

Related U.S. Application Data

(60) Provisional application No. 62/951,364, filed on Dec. 20, 2019.

(51) Int. Cl.
  *F24C 3/04* (2021.01)
  *F23D 14/66* (2006.01)
  *F24C 3/12* (2006.01)

(52) U.S. Cl.
  CPC ............. *F24C 3/042* (2013.01); *F23D 14/66* (2013.01); *F24C 3/122* (2013.01); *F23N 2235/16* (2020.01)

(58) Field of Classification Search
  CPC .. F24C 3/042; F24C 3/122; F24C 1/08; F24C 1/16; F24C 5/08; F24C 7/04; F24C 15/22;
  (Continued)

(56) References Cited

U.S. PATENT DOCUMENTS 3,310,047 A * 3/1967 Budden ................... F24C 15/22
                                                                        126/92 B
4,596,935 A * 6/1986 Lumpp ................... F21V 7/005
                                                                        392/424

(Continued)

FOREIGN PATENT DOCUMENTS

FR          2624253 A1 * 12/1987

OTHER PUBLICATIONS

Herschel, "How Infrared Heaters Work Webpage", https://www.herschel-infrared.com/how-infrared-heaters-work/, 2020, 6 pages.
(Continued)

*Primary Examiner* — Allen R. B. Schult
*Assistant Examiner* — William C Weinert
(74) *Attorney, Agent, or Firm* — Howard & Howard Attorneys PLLC

(57) ABSTRACT

A radiant heating assembly including a burner for heating a heat exchanger and a reflector generally disposed about the heat exchanger. The reflector comprising a base defining a first air chamber. The reflector may also comprise one or more wings removably coupled to the base. The wings may be configured to define a second air chamber. The radiant heating assembly may also comprise an air circulation pump configured to draw air through the air chamber of the base and/or wing and provide the air to the burner to improve the efficiency of the combustion process.

21 Claims, 19 Drawing Sheets

(58) Field of Classification Search
CPC .. F24C 15/24; F23D 14/66; F23D 2900/1412; F23N 2235/16
USPC .................................... 126/92 B; 431/243
See application file for complete search history.

(56) References Cited

U.S. PATENT DOCUMENTS

| | | | | |
|---|---|---|---|---|
| 5,468,143 | A * | 11/1995 | Weber | F23D 14/64 |
| | | | | 431/207 |
| 6,786,422 | B1 * | 9/2004 | Wortman | F23C 3/002 |
| | | | | 431/12 |
| 9,739,490 | B2 * | 8/2017 | Richter | F24D 19/062 |
| 2004/0058290 | A1 * | 3/2004 | Mauzey | F23D 11/441 |
| | | | | 431/243 |
| 2011/0079218 | A1 | 4/2011 | Wortman et al. | |
| 2018/0017250 | A1 * | 1/2018 | Wortman | F23N 5/022 |
| 2018/0100648 | A1 * | 4/2018 | Turner | F23C 3/002 |
| 2021/0041108 | A1 | 2/2021 | Johnson | |

OTHER PUBLICATIONS

Morgan Advanced Materials, "Alkaline Earth Silicate (AES) Wool Product Safety Data Sheet", Jun. 2015, 7 pages.
Morgan Advanced Materials, "Superwool Bulk Data Sheet", Feb. 28, 2018, 2 pages.
Owens Corning, "ThermRange System Insulation Product Data Sheet", Aug. 2012, 2 pages.
Unifrax, "Fiberfrax Blanket and Mat Products Product Information Sheet", 2017, 8 pages.

* cited by examiner

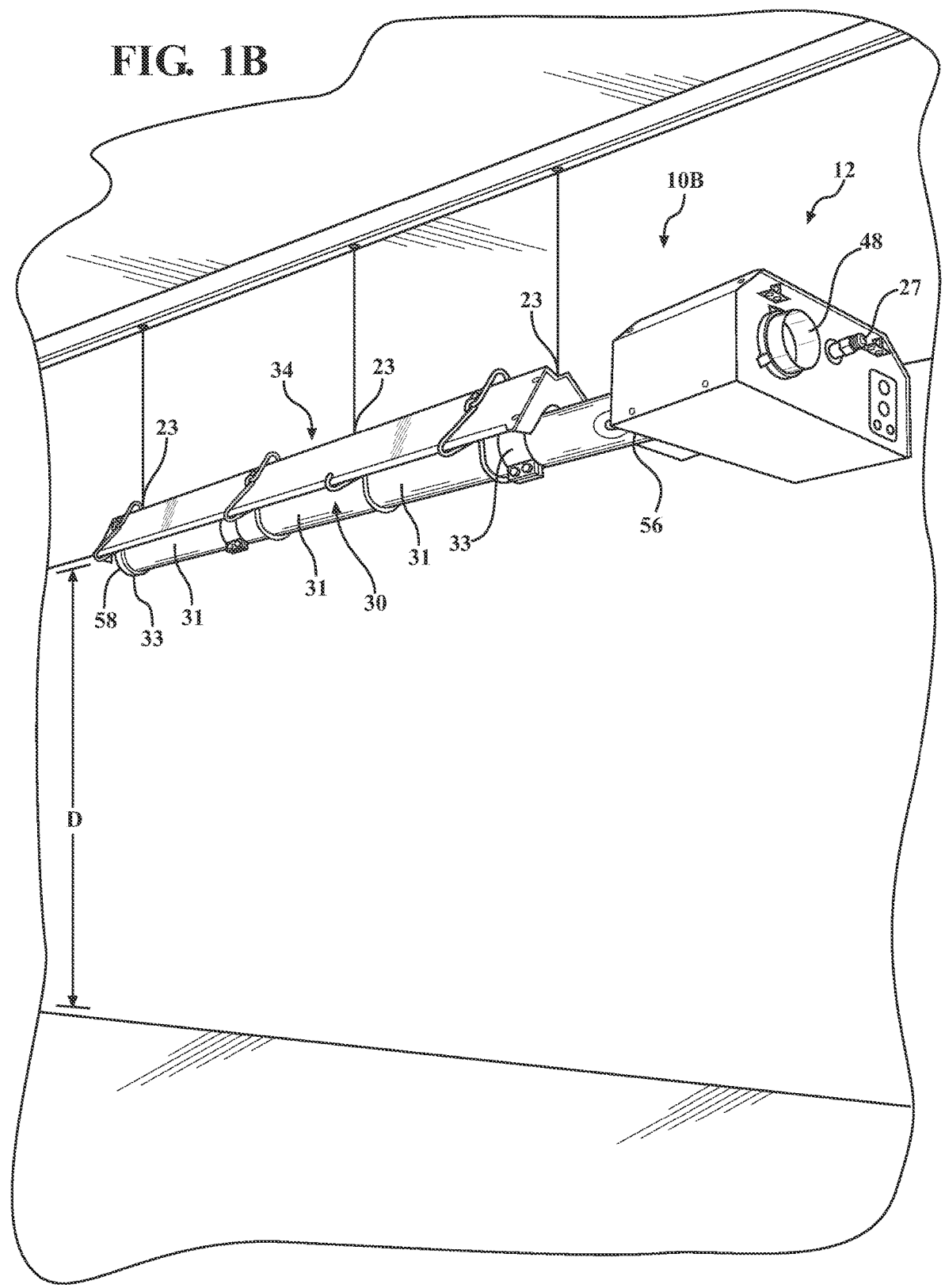

| Table 1: AKHL-150U Standard |||||||||||
|---|---|---|---|---|---|---|---|---|---|---|
| Basic Appliance (Normal Aluminized Painted Tubes, Standard Reflector) |||||||||||
| Radiant Factor (nett) [-] | Thermal Efficiency [-] | Convection loss [-] | Actual Heat Input (nett) [kW] | Heat on the Ground [kW] | T-flue [C] | T-ambient [C] | Humidity [-] | Baro [mbar] | CO [ppm] | $CO^2$ [%] |
| 0.615 | 0.874 | 0.259 | 41.45 | 25.5 | 248 | 26.4 | 35.5 | 1009 | 10 | 7.8 |

| Table 2: AKHL-150U Standard + Insulated Reflector |||||||||||
|---|---|---|---|---|---|---|---|---|---|---|
| Basic Appliance (Normal Aluminized Painted Tubes + Insulated Reflector) |||||||||||
| Radiant Factor (nett) [-] | Thermal Efficiency [-] | Convection loss [-] | Actual Heat Input (nett) [kW] | Heat on the Ground [kW] | T-flue [C] | T-ambient [C] | Humidity [-] | Baro [mbar] | CO [ppm] | $CO^2$ [%] |
| 0.691 | 0.868 | 0.177 | 40.9 | 28.3 | 256 | 24.7 | 45 | 1008 | 15 | 7.8 |

FIG. 8

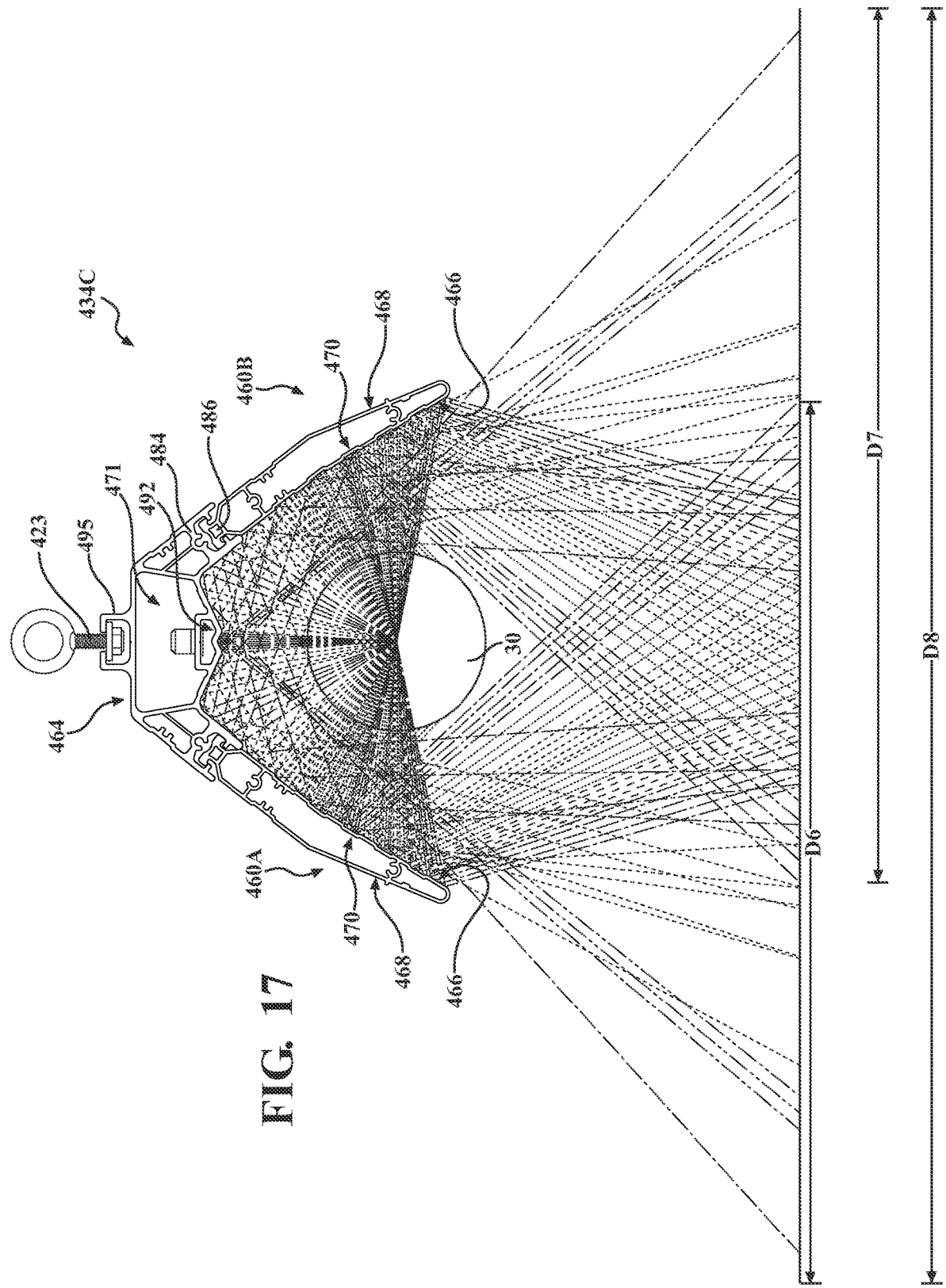

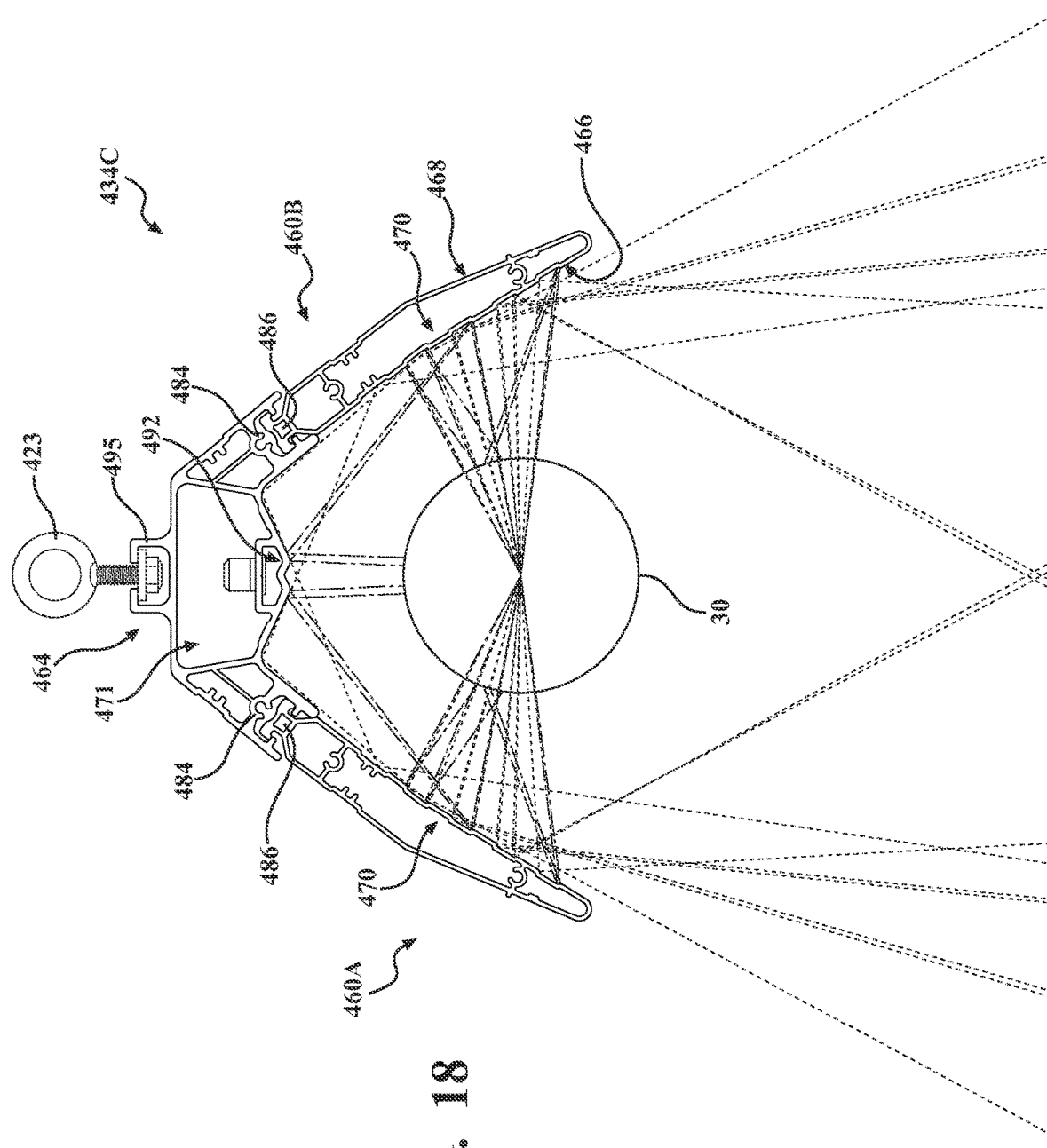

RADIANT HEATER ASSEMBLY

RELATED APPLICATIONS

This application claims priority to and the benefit of U.S. Provisional Patent Application No. 62/951,364, filed on Dec. 20, 2019, which is hereby incorporated herein by reference in its entirety.

BACKGROUND

Radiant heaters are widely utilized for a variety of heating purposes. One common type of radiant heater is a radiant tube heater including a burner and a heat tube extending from the burner. In the radiant tube heater, a gas valve provides gas into the burner while a blower motor provides air to the burner. The gas and the air are typically mixed and ignited in the burner. A flame and/or heated exhaust may pass from the burner to the heat tube such that the radiant tube heater emits radiant heat.

The radiant tube heater may be installed at various different heights above a floor or subjected to a wide variety of environmental conditions. Additionally, users of the radiant tube heater may desire a balanced distribution of heat across a length of the heat tube by selectively increasing blower speed to force the air quickly across the length of the heat tube. Alternatively, users may desire to operate the radiant tube heater in a more thermally efficient manner by selectively reducing input of air and gas into the burner or baffling various portions of the burner tube.

There remains an opportunity to provide a radiant tube heater which provides a heat reflector for a heater tube via an extended configuration not previously used in the art, while also decreasing the exterior surface temperature in that section of the heater tube reflector itself. Further, there remains an opportunity to provide a radiant tube heater which limits the external surface temperature of the radiant tube heater reflector during operation. Specifically, there remains an opportunity to provide a radiant tube heater including a three-point mounting reflector design which may include air pockets where air may be either stationary or drawn out by a fan evacuator. The heat pattern of the reflector may also be adjustable to specific locations where heat is needed by means of adjustments to the reflector as provided herein.

SUMMARY

The present invention includes a burner for receiving air and fuel for combustion and emitting heated exhaust or wash air. The present invention further includes an elongated heater tube in communication with the burner defining a first end and a second end and a length of tube between the first and second ends. The elongated heater tube includes at least one section or sections of conventional tubing as well as a reflector configuration. The elongated heater tube reflector has connections between the sections of the heater tube as shown in FIG. 1 to extend or shorten the length of the heater tube and reflector as needed for any particular space to be heated. The heat emanating from the heater tube is reflected downwardly usually to the floor of any facility being radiantly heated via the reflector elements.

The radiant tube heater can include a three-point mounting reflector design. The three-point mounting design can ease installation of the heater in a facility, particularly when the heater is disposed near the ceiling and directed toward the floor.

The reflector may also include air chambers or passageways where air may be either stationary or drawn out by a fan or air circulation pump.

The reflector elements include a multi-piece construction which can be assembled either on the ground or in the location usually elevated substantially off the ground.

The multi-piece construction also provides the ability to generate various configurations as desired within the same design, including possible hinged reflector elements and elements with air pockets configured within the reflector elements, where the air in the pockets can remain stationary or extracted from the pockets. The construction may also include extensions of the wing portions of the reflector to add options to the heat coverage mapping in any given location. Also, the heat coverage mapping may be adjustable in the field with the reflector of the present invention as described below.

BRIEF DESCRIPTION OF THE DRAWINGS

Advantages of the present invention will be readily appreciated as the same becomes better understood by reference to the following detailed description when considered in connection with the accompanying drawings wherein:

FIG. 1B is a perspective view of a radiant heating assembly including a housing and an elongated heat exchanger having a conventional heater tube and new reflector including the present invention;

FIG. 8 is a table of heater assembly thermal efficiency testing results;

FIG. 17 is a cross-sectional view of an alternative configuration of a reflector for use with the radiant heating assembly of FIG. 9, 13, or 14, the reflector including wings with a multifaceted surface for redirecting the heat energy produced by the heat exchanger; and FIG. 18 is a cross-sectional view of the reflector of FIG. 17 illustrating the directionality of the heat energy produced by the multifaceted surface of the wings that is different from a wing having a generally flat surface for redirecting the heat energy produced by the heat exchanger.

DETAILED DESCRIPTION

Figure 1A:
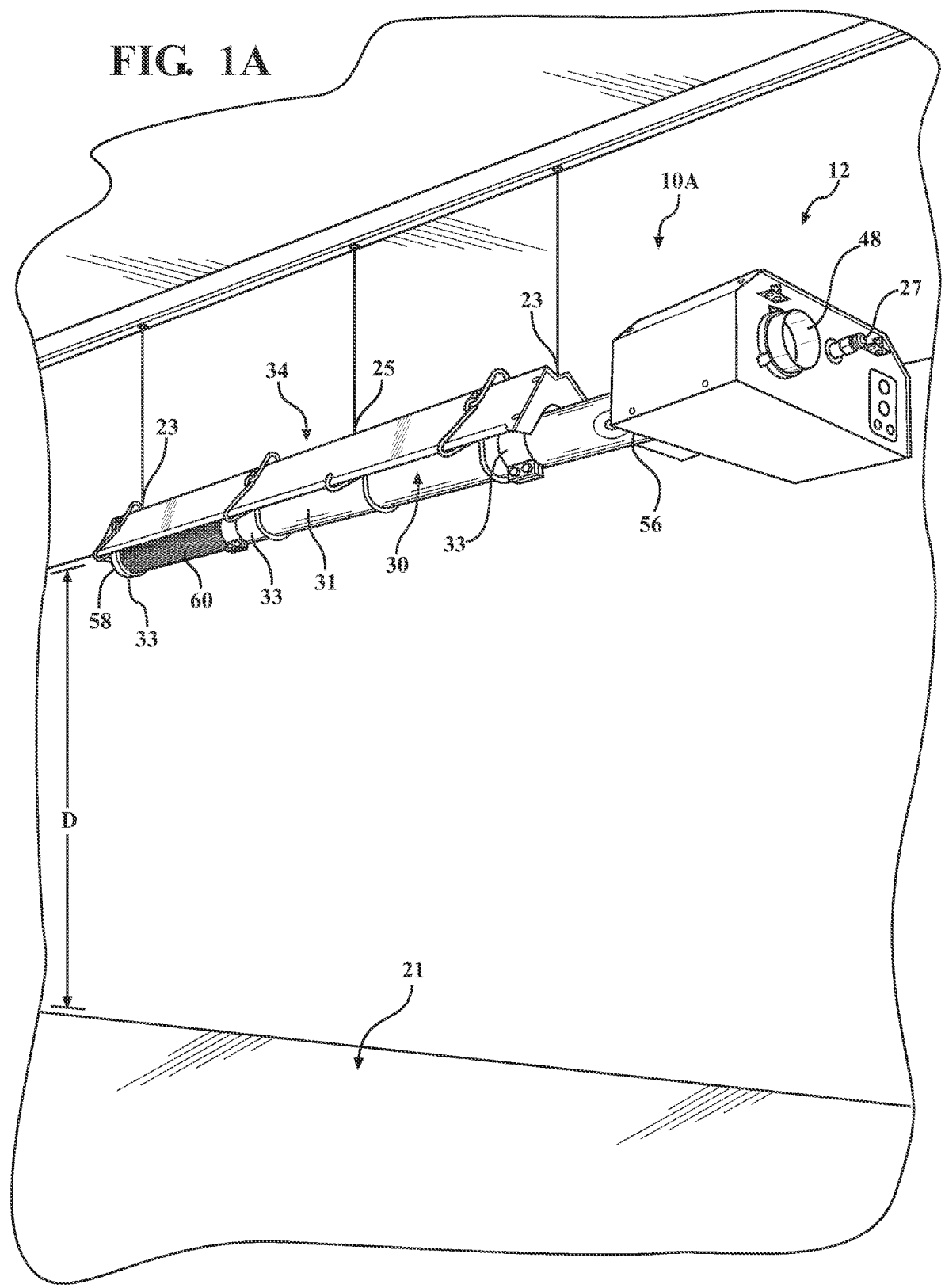
FIG. 1A is a perspective view of a radiant heating assembly including a housing and an elongated heat exchanger having a heater tube having a new end portion and new reflector including the present invention.

Referring to the Figures, wherein like numerals indicate like parts throughout the several views, a radiant heating assembly is generally shown as 10. As shown in FIG. 1A or 1B, the radiant heating assembly 10A or 10B is typically suspended above an area to heat the area with a substantial distance "D" from the floor 21 to heat exchanger 30 of 10 feet to 40 feet or more. The radiant heating assembly 10A or 10B may be installed in the interior or the exterior of any type of building or structure, such as a restaurant, factory, warehouse, arena, etc. Alternatively, the radiant heating assembly 10A or 10B may be independently suspended above any area such as a patio, and the like.

The radiant heating assembly 10A or 10B may include a housing 12 for accommodating various components of the radiant heating assembly 10A or 10B. The housing 12 is typically formed of sheet metal but may be formed of any type of material without departing from the nature of the present invention. Furthermore, the housing 12 may have any suitable configuration for accommodating various components of the radiant heating assembly 10A or 10B.

Figure 2:
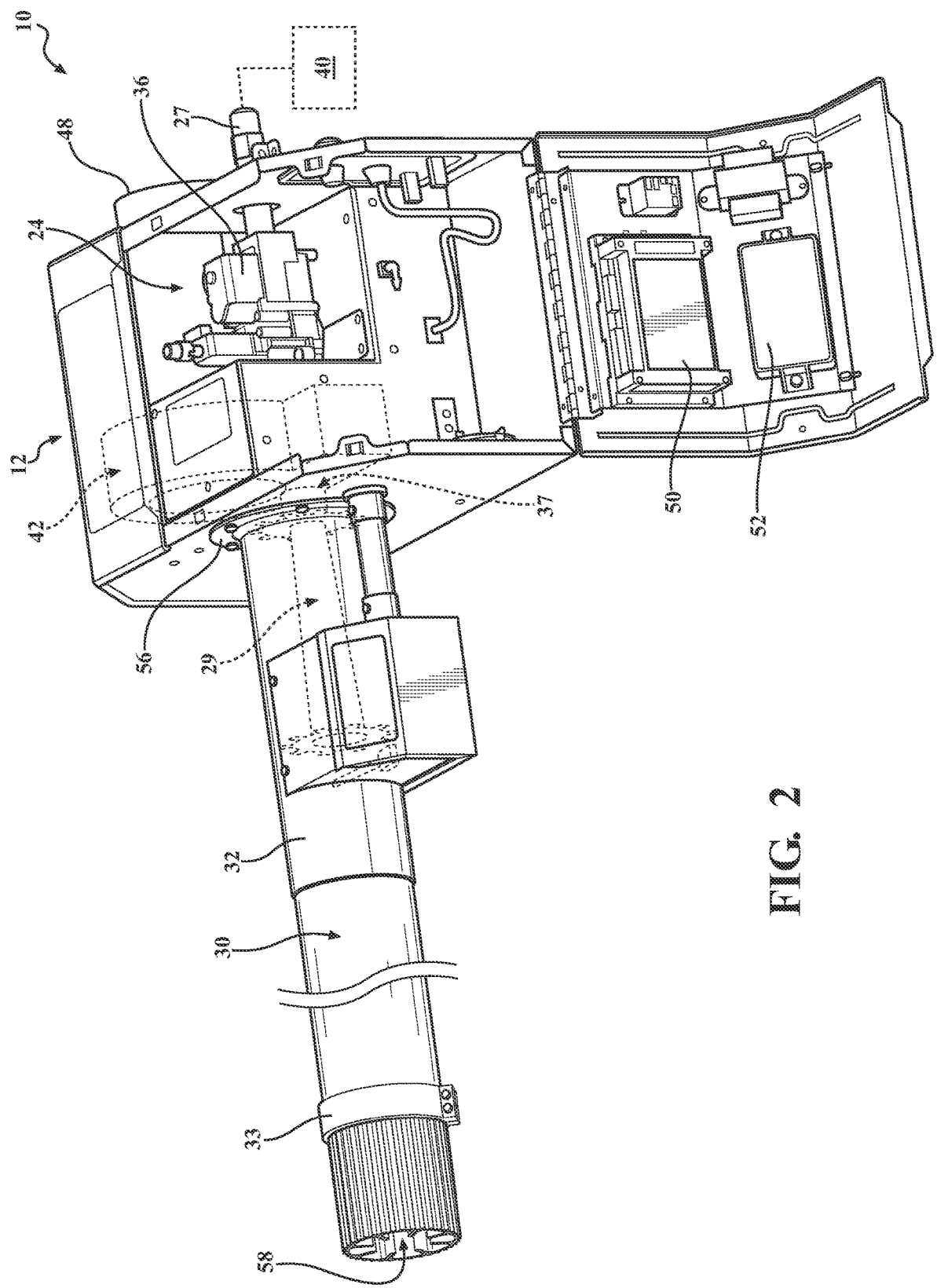
FIG. 2 is a perspective view, partially in cutaways of the radiant heating assembly of FIG. 1 including a burner, a fuel valve for providing fuel to the burner, a blower for providing air to the burner, and a controller configured to control the air and the fuel provided to the burner with the heater tube broken to show the two ends of the tube.

With reference to FIG. 2, the radiant heating assembly 10A or 10B includes a burner 24 for receiving air and fuel for combustion. The burner 24 typically has an inlet 37 for receiving the air and fuel. The air and fuel are typically mixed and ignited in the burner 24. However, it is to be appreciated that the air and fuel may be mixed before being received by the burner 24 according to any suitable method. The burner 24 typically combusts the air and fuel into exhaust. This exhaust is commonly referred to as "wash air." The burner 24 may include an outlet 29 for emitting exhaust generated by combustion of the air and fuel. While not illustrated in the Figures, it is contemplated that the radiant heating assembly 10A or 10B may include a plurality of burners 24. Each burner 24 may have a venturi configuration but alternatively may have other configurations without departing from the nature of the present invention. The burner 24 is typically disposed at least partially within the housing 22.

The radiant heating assembly 10A or 10B includes an elongated heat exchanger 30 in communication with the burner 24. The heat exchanger 30 may also be referred to as a burner tube. The elongated heat exchanger 30 typically has an inlet 32 for receiving the exhaust emitted by the outlet 29 of the burner 24. The burner 24 may be positioned adjacent the inlet 32 of the elongated heat exchanger 30. The exhaust emitted by the outlet 29 of the burner 24 passes through and heats the elongated heat exchanger 30 such that the elongated heat exchanger 30 emits radiant heat. The elongated heat exchanger 30 may be coupled to the housing 22 at one end. The elongated heat exchanger 30 may include a vent cap at another end to vent the exhaust passing through the elongated heat exchanger 30. Generally, the elongated heat exchanger 30 is mounted below a reflector 34 covering a significant portion of a length of the elongated heat exchanger tube 30. The reflector 34 directs radiant heat in a directional path towards the area to be heated to optimize the pattern of radiant heat emitted by the elongated heat exchanger 30.

The elongated heat exchanger 30 may have various lengths and shapes. Typically, the elongated heat exchanger 30 has a circular cross-section. However, the elongated heat exchanger 30 may have other cross-sections such as a rectangular cross-section, oval cross-section, and the like. The elongated heat exchanger 30 may extend in any suitable path, such as a straight path, an L-shaped path, a U-shaped path, and the like. Additionally, the radiant heating assembly 10A or 10B may include a plurality of elongated heat exchangers 30 for receiving exhaust emitted by one or more burners 24.

The radiant heating assembly 10A or 10B includes a fuel valve 36 for providing the fuel to the burner 24 from a fuel inlet 27. The fuel valve 36 may provide fuel directly to the inlet 37 of the burner 24. Typically, the fuel valve 36 is coupled to a fuel source 40 via the fuel inlet 27 which provides fuel to the fuel valve 36. The fuel may be natural gas, although any suitable fuel, such as propane, may be received by the fuel valve 36. The fuel valve 36 may be disposed within the housing 22.

The fuel valve 36 may be configured to provide the fuel according to a modulating operation but may also be supplied without modulating operation. With respect to the fuel valve 36, the term "modulating," is meant generally to describe operating the fuel valve 36 according to any given one of a plurality of fuel input rates defined within a predetermined range of fuel input rates. In the modulating operation, the fuel valve 36 may provide the fuel to the burner 24 according to one of the pluralities of fuel input rates. It is to be appreciated that the fuel input rate may correspond to any suitable unit of measurement. The fuel valve 36 is generally capable of allowing from 0% to 100% of the fuel provided to the fuel valve 36 to pass to the burner 24. Said differently, the fuel valve 36 is capable of opening between 0% and 100% to provide various amounts of the fuel to the burner 24.

The radiant heating assembly 10A or 10B includes a blower 42 for providing the air to the burner 24. The blower 42 may receive the air and provide the air directly to the inlet 37 of the burner 24. Typically, the blower 42 receives air from an air source 46 such as ambient air. In particular, the blower 42 may draw the air through an aperture 48 defined in the housing 22 before providing the air to the burner 24. The blower 42 may be disposed within the housing 22 and in fluid communication with the elongated heat exchanger 30 for forcing the exhaust through the elongated heat exchanger 30.

In one configuration, the blower 42 may force the air through the burner 24 and the exhaust through the elongated heat exchanger 30 by expelling the air away from the blower 42. Alternatively, the blower 42 may force the air through the burner 24 and the exhaust through the elongated heat exchanger 30 by pulling the air towards the blower 42.

As with the fuel valve 36, the blower 42 may be configured to provide the air according to a modulating operation or may be supplied with no modulation whatsoever. With respect to the blower 42, the term "modulating," is meant generally to describe operating the blower 42 according to any given one of a plurality of blower input rates defined within a predetermined range of blower input rates. The blower 42 typically includes a variable speed motor capable of providing the air at various rates. More specifically, the variable speed motor may be an electrically commutated motor or a permanent split capacitor motor. The blower 42 is generally capable of operating between 0 and 10,000 RPM. However, it is to be appreciated that the blower 42 may operate in any other suitable range. In the modulating operation, the blower 42 may provide the air to the burner 24 according to one of the pluralities of blower input rates, as will be described below. The blower input rate may correspond to any suitable unit of measurement. For example, the blower input rate may correspond to a pressure differential measured at one or more locations within the blower 42, the burner 24, and the elongated heat exchanger 30, and the like. Specifically, the radiant heating assembly 10A or 10B may include a pressure sensor for measuring the pressure differential and for providing a signal corresponding to the pressure differential measured.

As shown in FIG. 2, the radiant heating assembly 10A or 10B includes a controller 50 configured to control the amount of the air and the fuel provided to the burner 24 by modulating at least one of the fuel valve 36 and the blower 42. The controller 50 may include a processing unit, such as a microcontroller for receiving inputs and processing and executing commands. Furthermore, the controller 50 may include logic, such as PID logic, and memory for monitoring information on past on/off heating cycles and optimizing on/off heating cycles based on the monitored information for increasing efficiency of the radiant heating assembly 20. The controller 50 may be disposed within the housing 22 and electrically connected to the fuel valve 36 and the blower 42. The controller 50 is in electrical communication with a power source (not shown). However, electrical connections between the controller 50, the fuel valve 36, and the blower 42 are generally not shown in the figures for simplicity in illustration.

The radiant heating assembly 10A or 10B may also include an ignition controller 52. Typically, the ignition controller 52 is operatively connected between the burner 24 and the controller 50. Furthermore, an ignitor (not shown) may be disposed within or adjacent to the burner 24 for providing a flame for igniting the air and the fuel within the burner 24. The ignitor may be controlled by the ignition controller 52. In addition, a flame sensor (not shown) may be disposed adjacent the burner 24 for monitoring the flame within the burner 24. The ignition controller 52 regulates the flame provided by the ignitor according to signals provided by the flame sensor. The ignition controller 52 is typically mounted in the housing 12. The ignition controller 52 may be configured to provide ignition sequencing and safety lock-out operations for the radiant heating assembly 10A or 10B.

In some instances, the controller 50 may modulate the fuel valve 36 independent of the blower 42. That is, the controller 50 may provide a fuel control signal to the fuel valve 36 before or after providing a blower control signal to the blower 42. Similarly, the controller 50 may vary the fuel control signal before or after varying the blower control signal.

Alternatively, the controller 50 may simultaneously modulate the fuel valve 36 and the blower 42. Specifically, the controller 50 may provide the fuel control signal to the fuel valve 36 simultaneously while providing the blower control signal to the blower 42. Moreover, the controller 50 may vary the fuel control signal simultaneously while varying the blower control signal.

With reference to FIGS. 1A and 1B, the elongated heat exchanger 30 defines a first end 56 coupled to the housing 12 and a second end 58 extending from the first end 56. The elongated heat exchanger 30 may further comprise one or more lengths or segment of tubing 31 that defines a length between the first 56 and second 58 ends. The one or more segments of tubing 31 may be connected to one another using a conventional sleeve 33 or connector.

Figure 12:
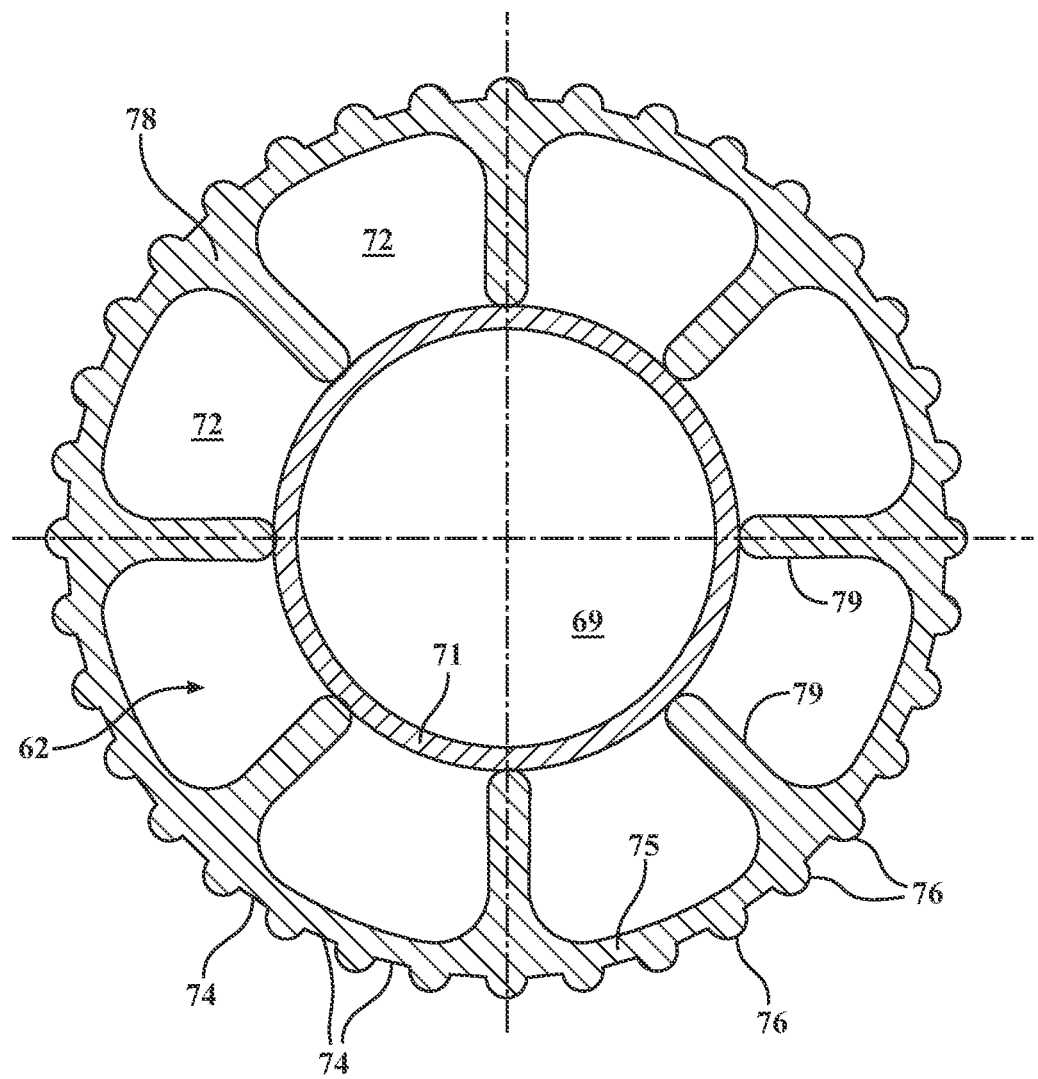
FIG. 12 is a cross-sectional view of one configuration of the last section of the heating tube shown in FIG. 1A.

As shown in FIG. 1A, the elongated heat exchanger 30 may also include an end tube member 60 that is disposed at the second end of the elongated heat exchanger and is connected to the conventional tube 31 preceding via conventional sleeves 33 as shown. The end tube member 60 (see FIG. 12) has an interior cross section 62 for receiving the exhaust through a central chamber 69, and separate chambers 72 surrounding the central chamber 69, which combine to baffle the exhaust gases to comprise a heat sink while also still providing heat to the reflector 34. As shown in FIG. 12, the end tube member 60 also includes an exterior surface 74 comprising a series of linear beads 76 (or fins) around the circumference of the exterior surface 74 of the outer wall 78 of the last section tube 60 which act as uninsulated fins to reduce the surface temperature of the last section tube 60.

The cross section of FIG. 12 as shown has eight chambers 72 formed by the exterior surface 71 of the inner smaller tube 73 surrounding the central chamber 69, the interior surface 75 of the tube 60, and multiple fins 79 disposed between those two surfaces. The fins 79 may be integrally extruded with the exterior wall 78 of the end tube member 60 with the smaller tube 73 forming the central chamber 69 positioned within the extrusion as shown in FIG. 12. Alternatively, it is anticipated that the entire cross section can be extruded as one piece. The fins 79 engage both the inner tube 73 and the outer tube wall 78 to space the liner tube 73 from the outer tube wall 78 along at least a substantial portion of the length of the last section tube.

Figure 3:
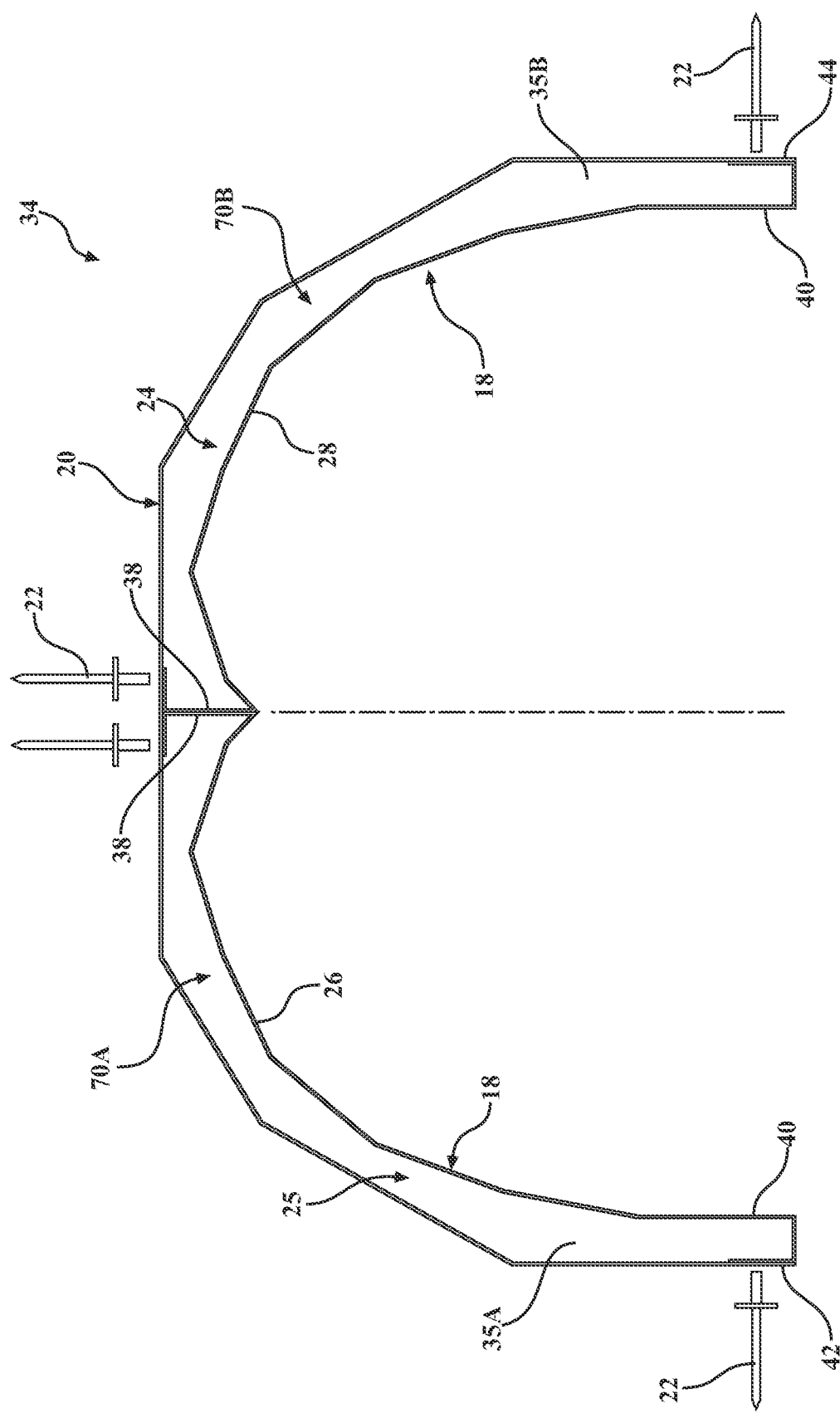
FIG. 3 is a cross-sectional view of the reflector including an outer shell, an inner shell, and an insulation layer disposed between the outer and inner shells.

The radiant heating assembly 10A or 10B includes a reflector 34 for directing the radiant heat toward a targeted area (not shown). As shown in FIG. 3, the reflector 34 includes an inner shell 18 and an outer shell 20 with the inner shell 18 abutting the outer shell 20. The reflector 34 includes a plurality of fasteners 22 for coupling the outer shell 20 to the inner shell 18. As set forth below, the reflector 34 includes an insulation layer 25 disposed between the inner and outer shells 18, 20 for insulating the inner shell 18 and improving performance characteristics of the heater assembly 10A or 10B. This insulation layer may comprise an insulated material or may comprise an open-air chamber, as described in the following alternative descriptions.

The inner shell 18 of FIG. 3 has a M-shaped configuration and may be made of any suitable material, such as, aluminum or steel. The inner shell 18 includes a first member 26 and a second member 28 coupled to the first member 26 along an axis A1. The reflector 34 defines a first chamber 70A between the outer shell 20 and the first member 126 of the inner shell 18 and the reflector 34 defines a second chamber 70B between the outer shell 20 and the second member 28 of the inner shell 18. The insulation layer 25 is disposed in the first and second chambers 70A, 70B for insulating the inner shell 18.

Figure 6:
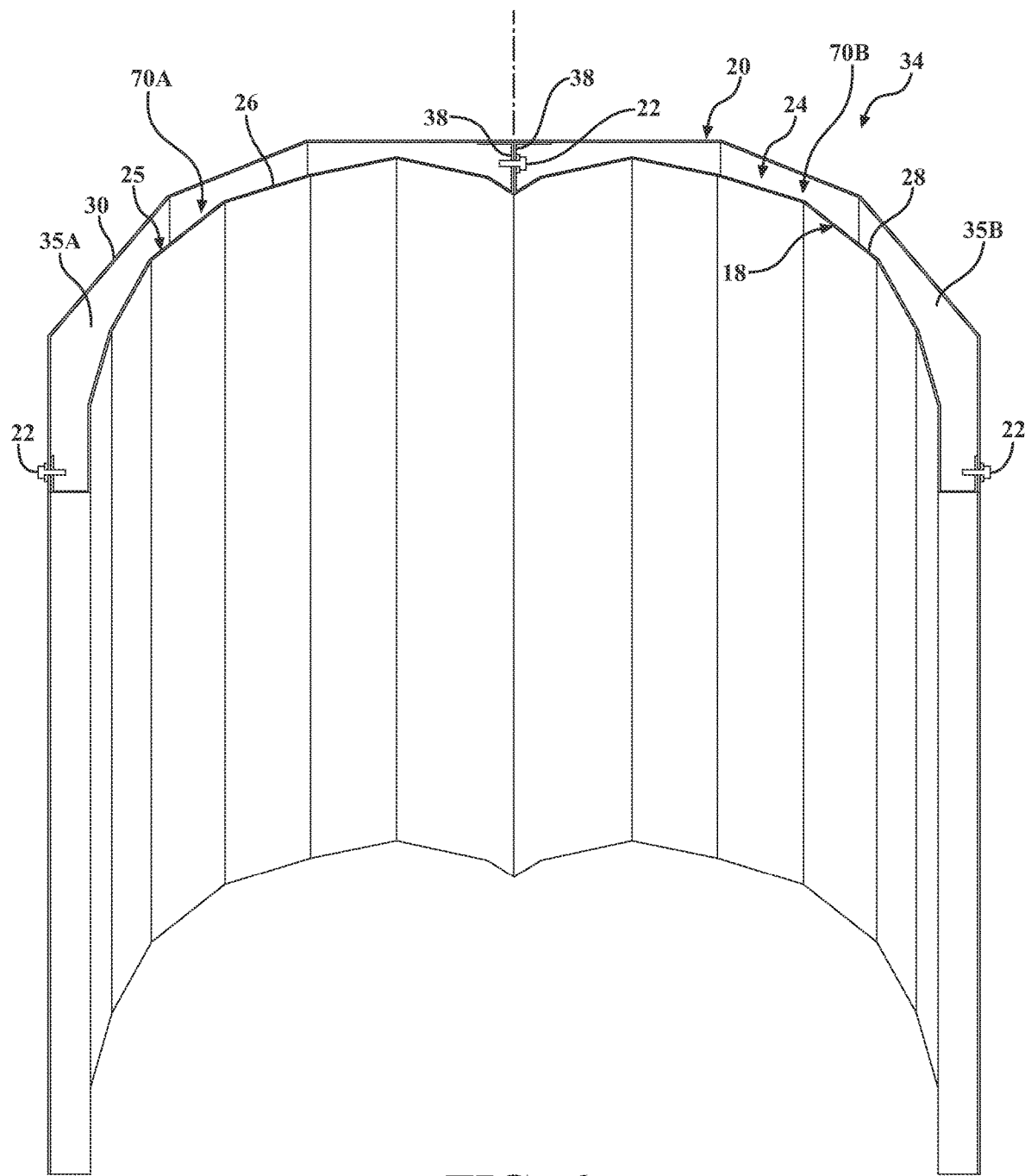
FIG. 6 is a perspective view of the outer shell coupled to the inner shell.
Figure 7:
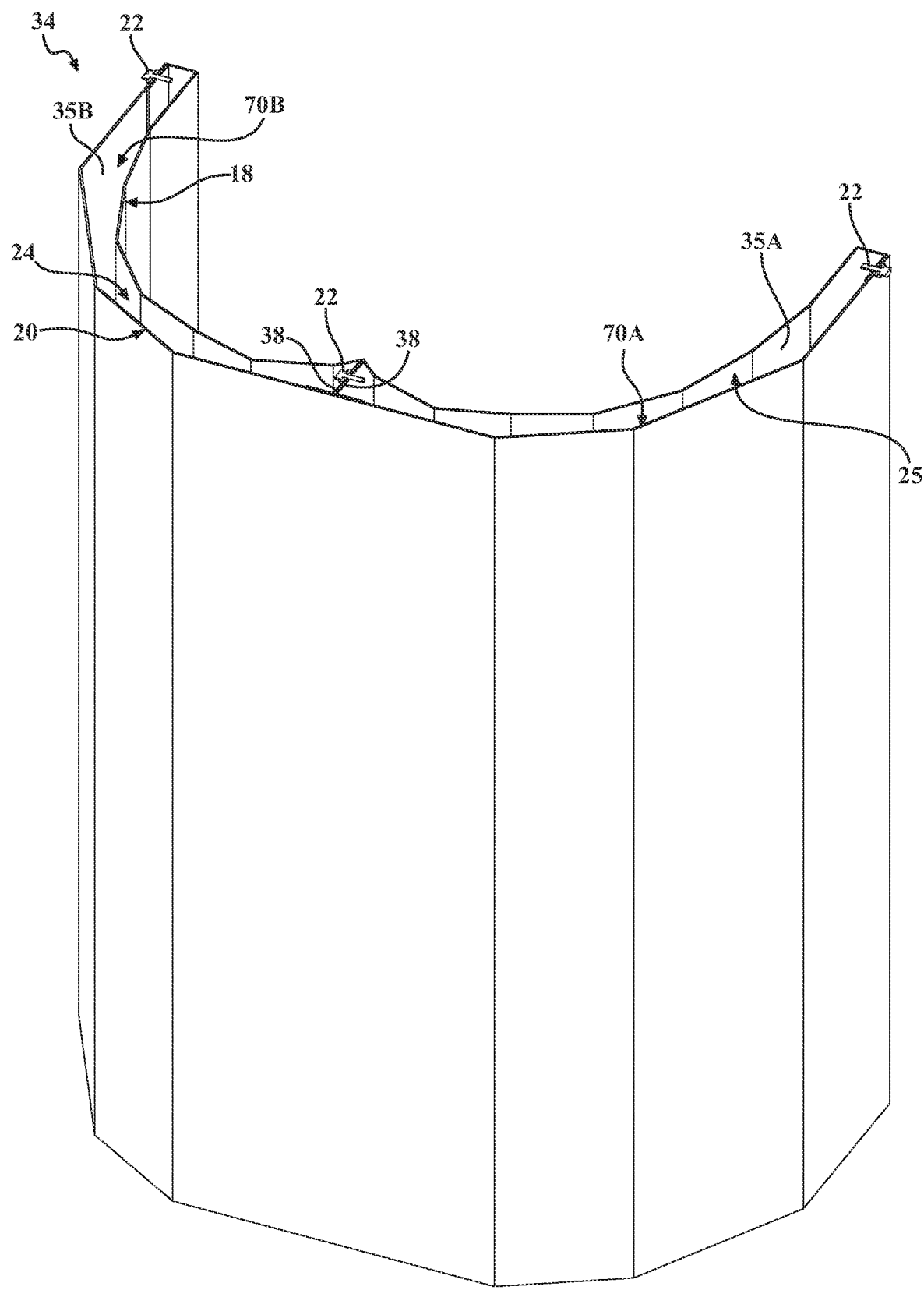
FIG. 7 is another perspective view of the outer shell coupled to the inner shell.

The insulation layer 25 includes a first insulation element 35A disposed in the first chamber 70A and abutting the first member 26 for insulating the first member 26. The insulation layer 25 includes a second insulation element 35B disposed in the second chamber 70B and abutting the second member 28 for insulating the second member 28. The first and second insulation elements 35A, 35B may be made of any suitable insulation material, such as Morgan Superwool® Bulk or Unifrax Fiberfrax® Blanket, or possibly Owens Corning ThermoRange® Fiberglass. In an alternative configuration, as shown in FIGS. 6 and 7, the first and second insulation elements 35A, 35B may be a fluid layer, such as air, in the first and second chambers 70A, 70B between the inner and outer shells 18, 20. It should be appreciated that the insulation layer 25 could have a one-piece configuration.

Figure 4:
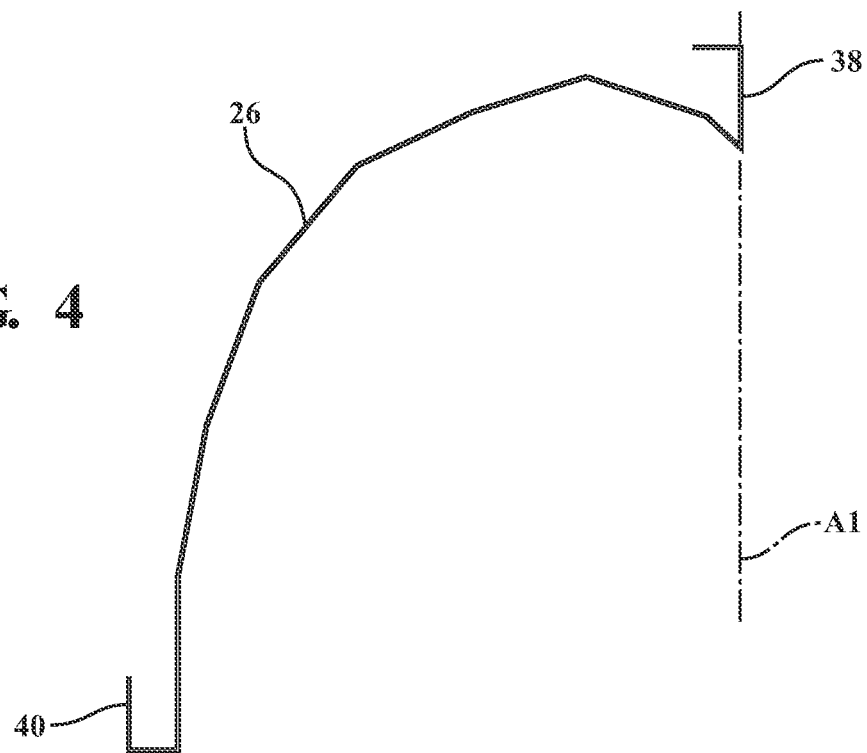
FIG. 4 is a side view of a first member of the inner shell.

As shown in FIG. 4, the first member 26 has a first end 38 and a second end 40 spaced from the first end 38. It should be appreciated that the dimensions and angles shown are exemplary and the first member 26 should not be limited to the dimensions and angles shown. The second member 28 has a symmetrical cross-section configuration to the first member 26 reflected across the first axis A1. As shown in FIGS. 3 and 6-7, the first end 38 of the first member 26 abuts the first end 38 of the second member 128 along the axis A1. The second ends 40 of the first and second members 24, 26 are spaced from each other relative to the axis A1.

Figure 5:
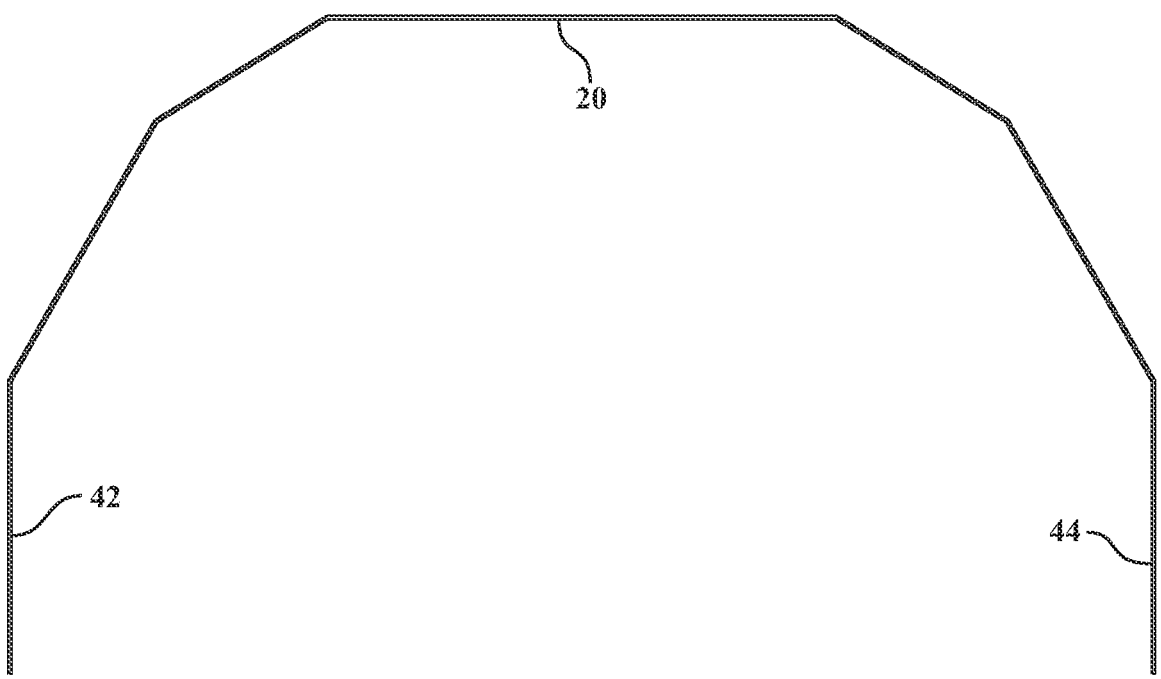
FIG. 5 is a side view of the outer shell.

As shown in FIG. 5, the outer shell 20 has a C-shaped configuration cross-section with a first end 42 and a second end 44 spaced from the first end 42. The first end 42 of the outer shell 20 is coupled to the second end 40 of the first member 26 by one of the plurality of fasteners 22. The second end 44 of the outer shell 20 is coupled to the second end 40 of the second member 28 by another one of the plurality of fasteners 22. The outer shell 20 is made of aluminum, but can be made of any suitable alternative metal, such as, steel. It should be appreciated that the dimensions and angles shown are exemplary and the outer shell 20 should not be limited to the dimensions and angles shown.

Performance characteristics of a radiant heating assembly 10A including a reflector 34 without an insulation layer 24 are shown in Table 1 of FIG. 8. As shown in Table 2 of FIG. 8, a radiant heating assembly 10 including a reflector 34 with an insulation layer 25 has improved performance characteristics over a heater assembly 10A without an insulation layer 25.

Figure 9:
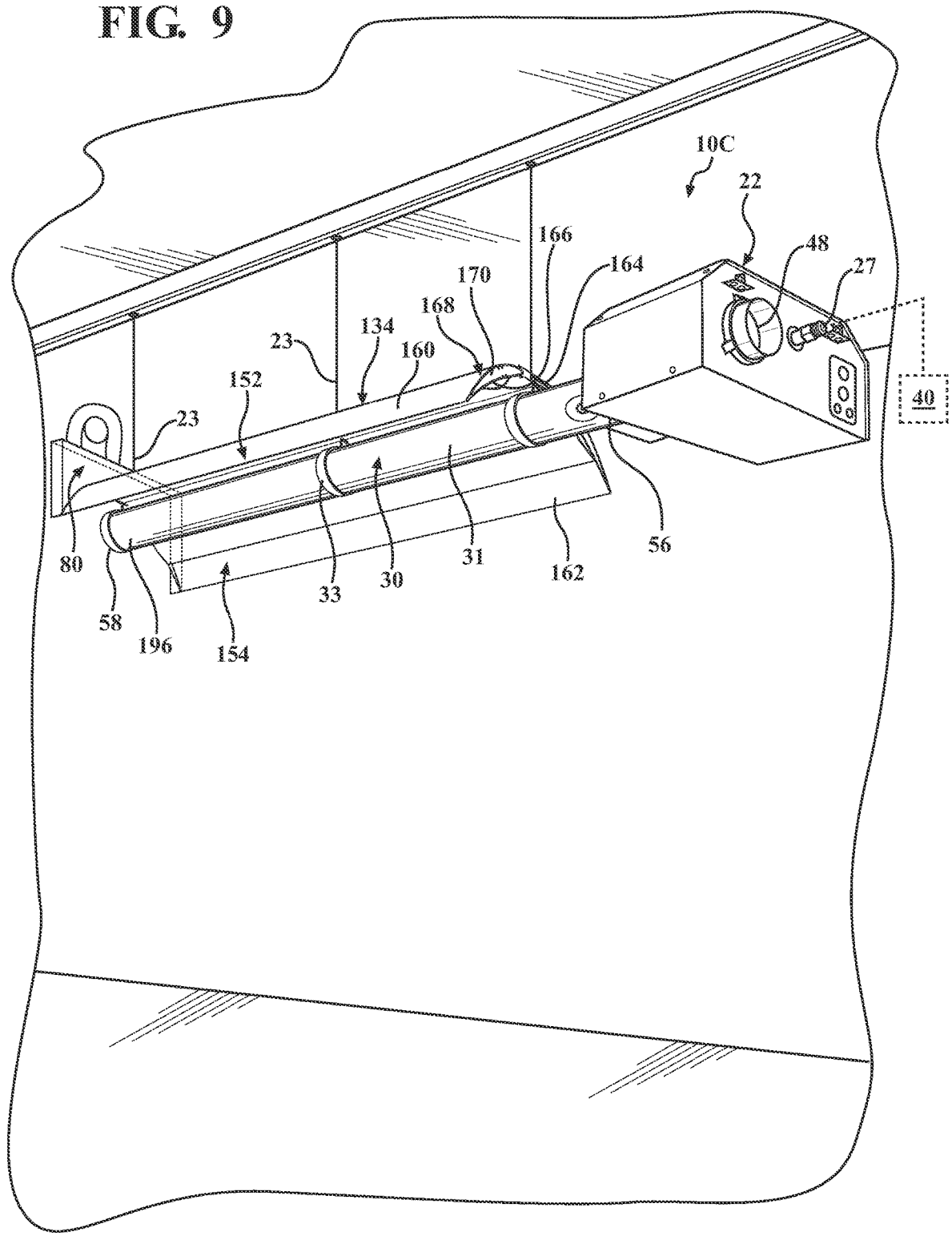
FIG. 9 is a perspective view of a radiant heating assembly similar to the one illustrated in FIGS. 1A and 1B including an alternative configuration of a reflector.

Referring to FIG. 9, an alternative configuration of the radiant heating assembly 10C is illustrating including an alternative design for a reflector 134 that is configured to permit airflow to occur within the reflector 134. The radiant heating assembly 10C illustrated in FIG. 9 use many of the same and/or similar parts from radiant heating assemblies 10A and 10B described above, but with the alternative reflector 134 design. I should be understood that the reflector 134 illustrated in FIG. 9 could also be used with the radiant heating assemblies 10A, 10B described above.

The radiant heating assembly 10C illustrated in FIG. 9 further comprises a vacuum pump 80. The vacuum pump 80 may be coupled to one end of the reflector 134 to pull air through the reflector 134 and maintain a cooler temperature on the outer surface 152 of the reflector 134 than on an inner surface 154. As illustrated in FIG. 9, the vacuum pump 80 may be disposed as the end of the reflector 134 that is proximate the second end 58 of the heat exchanger 30. While not illustrated in the Figures, it is contemplated that the vacuum pump 80 may also be disposed as the end of the reflector 134 that is proximate the first end 56 of the heat exchanger 30, nearest the housing 12 that encases the burner 24.

Figure 10A:
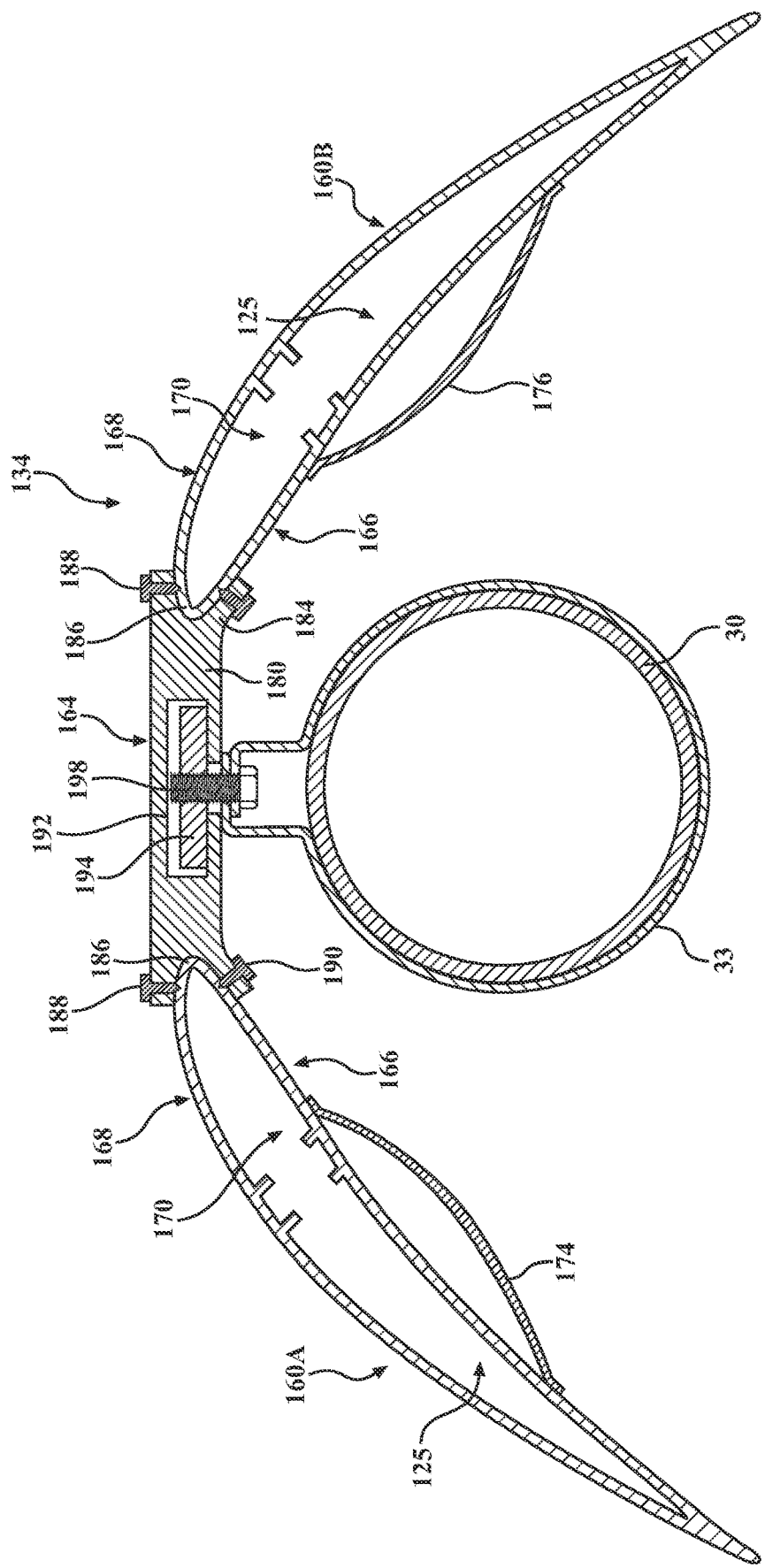
FIG. 10A is a cross-sectional view of the reflector of FIG. 9.
Figure 10B:
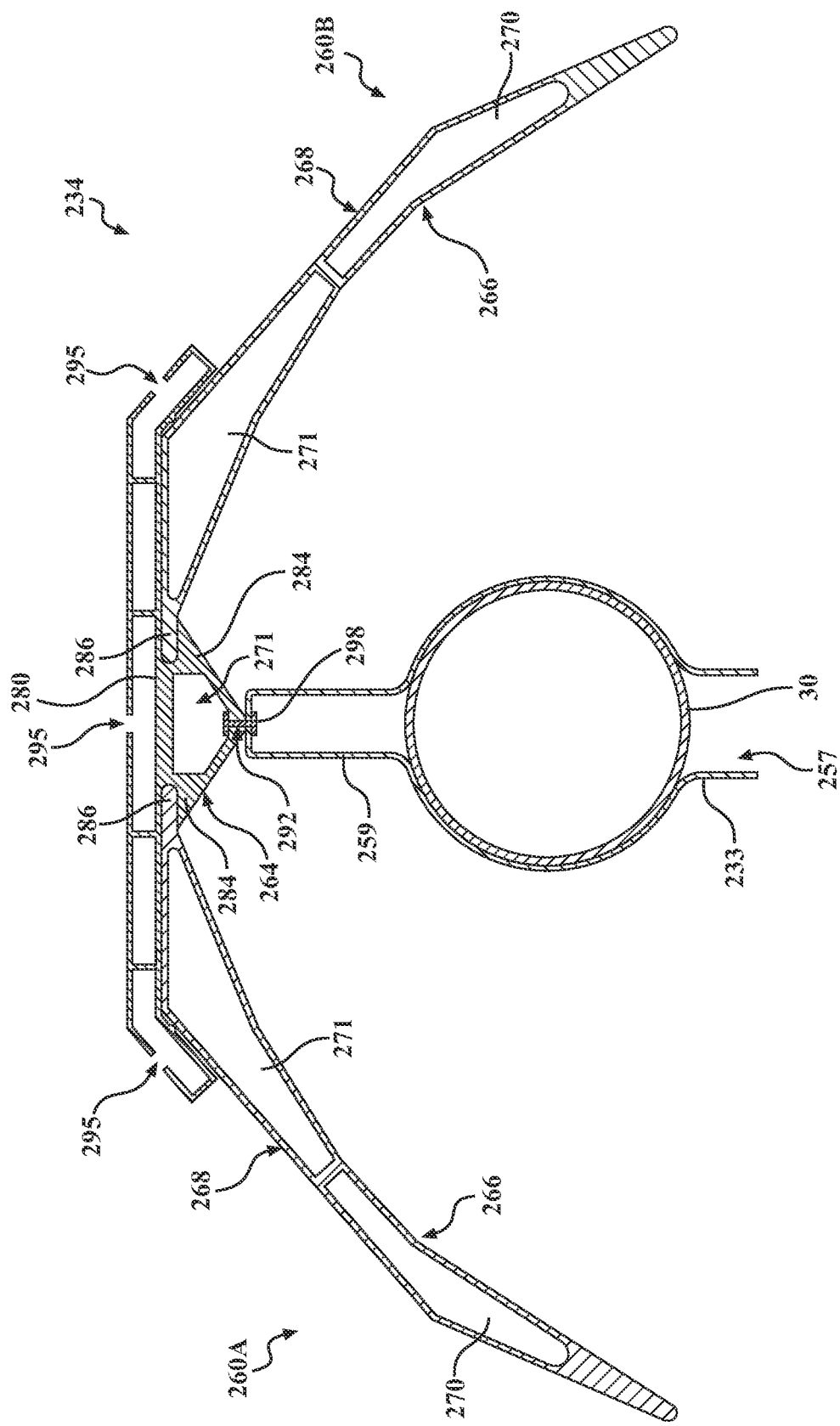
FIG. 10B is a cross-sectional view of alternative configuration of a reflector for use with the radiant heating assembly of FIG. 9.

A cross section of exemplary configuration of the reflector 134, 234 for use as part of the radiant heat assembly 10C is illustrated in FIGS. 10A and 10B. In describing the various configurations of the reflector, common components and/or features have been identified by a common reference number separated by factors of 100. For example, a first configuration of the reflector 134 and a second configuration of the reflector 234 each include the common base reference number of 34. It should be understood that the features or components including the same common reference may operate and/or function in the same manner across the different designs.

A first configuration of the reflector 134 is illustrated in FIG. 10A. The reflector 134 may comprise a pair of wings 160A, 160B extending from a central body 164, which engages the elongated heat exchanger 30 at spaced apart locations as shown in FIGS. 9 and 10A. Each of the wings has an inner surface 166 and an outer surface 168 formed by an extrusion operation to provide a primary air chamber 170 in each of the wings 160A, 160B of the reflector 134. An additional air chamber 172 may also be included in each wing 160A, 160B of the reflector 134 to further control the temperature of the inner reflector surface 166 as well as added inner reflector surfaces 174 and 176 as desired. One example would be the addition of surfaces 174- and 176 in an intermediate location on each wing 160A, 160B which also can be used to control the heat reflection pattern of the reflector 34 by varying the dimension, the depth or the overall configuration of the added inner reflector surfaces 174, 176 by changing the configuration of the air chamber 172 or otherwise.

As illustrated in FIG. 10A, the central mounting body defines a three-point central mounting body 164 is shown to assemble and mount the reflector wings 160A, 160B to the elongated heat exchanger 30. The central mounting body 164 has a mounting portion 184 that is configured to mate with an end portion 186 of each wing 160A, 160B to hold each of the wings 160A, 160B in place on the central mounting body 164. Fasteners 188 and 190 are spaced along the length of the wings 160A, 160B and central mounting body 164 to hold the parts together in a preselected position, although it is anticipated that adjustment can be made as needed to attain the proper heat deflection of the reflector wings 160A, 160B.

The central mounting body 164 also includes an elongated slot 192 along its length within which a slider nut 194 can be inserted to match each hangar sleeve 33 associated with the elongated heat exchanger 30. In FIGS. 9 and 10A, three hangar sleeves 33 are shown. Correspondingly, three slider nuts 194 would be inserted in the slot 192 and corresponding bolts 198 would be threaded through each sleeve 196 and threaded into a corresponding slider nut 194 until each nut 194 and corresponding sleeve 196 is locked in place both axially and frictionally. The combination of the elongated slot 192 with the slider nut and corresponding bolt mount the hangar sleeves 33 and by extension the elongated heat exchanger 30 tubing 31 to the reflector 134. The elongated slot 192 that extends the length of the central mounting body allows the nut 194 and corresponding bolt 198 to slide along the length of the reflector so that the various hangar sleeves 33 may be positioned at any point along the length of the reflector. This is helpful when you have varying lengths of tubing 31 that need to be coupled together and/or allows for the length of the tubing 31 to be adjusted to meet the needs of the space to be heated by the radiant heating assembly 10.

A second configuration of the reflector 234 is illustrated in FIG. 10B. The reflector 234 may comprise a pair of wings 260A, 260B extending from a central body 264, which engages the elongated heat exchanger 30 at spaced apart locations as shown in FIG. 9. However, as illustrated in FIG. 10B, the hangar sleeves 233 that creates the interface between the elongated heat exchanger 30 and the reflector 234 is a spring steel (spring loaded) holder 259 into which the elongated heat exchanger 30 is pressed into the open end 257 and held in place by the force of the spring load. The holders 259 coupled to the central body 264 of the reflector 234 for supporting the elongated heat exchanger 30. Each of the wings has an inner surface 266 and an outer surface 268 formed by an extrusion operation to provide air chambers 270 and 271 in each of the wings 260A, 260B of the reflector 234.

A three-point central mounting body 265 is shown to assemble and mount the reflector wings 260A, 260B to the elongated heat exchanger 30 via the holders 259. The central mounting body 280 has a mounting portion 284 that mates with an end portion 286 of each wing 260A, 260B to hold each of the wings 260A, 260B in place in the central mounting body 280. Fasteners 288 and 290 are spaced along the length of the wings 260A, 260B and central mounting body 280 to hold the parts together in a preselected position, although it is anticipated that adjustment can be made as needed to attain the proper heat deflection of the reflector wings 260A, 260B. The third point is the attachment fastener 292 between the mounting body 264 and the holder 259. The top portion 295 is configured to be the attachment points 23 as described above and can be one attachment point or multiple attachment points (as shown), as desired.

Figure 11:
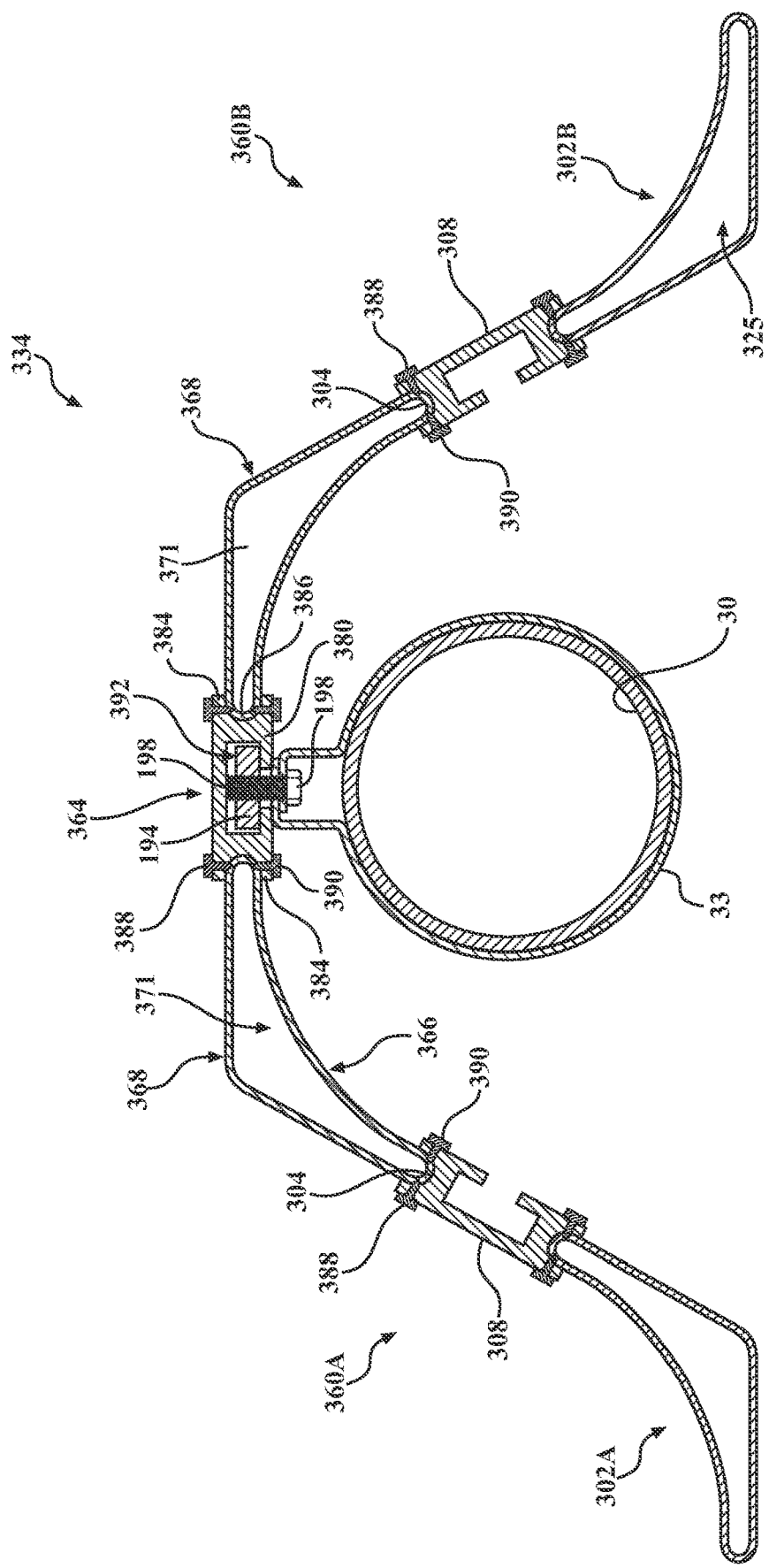
FIG. 11 is a cross-sectional view of an alternative configuration of a reflector for sue with the radiant heating assembly of FIG. 9.

A third configuration of the reflector 334 is illustrated FIG. 11. The reflector 334 may comprise a pair of wings 360A, 360B extending from a central body 364, which engages the elongated heat exchanger 30 at spaced apart locations. Each of the wings has an inner surface 366 and an outer surface 368 formed to define an air chamber 371. Similar to as is described above, the wings 360A, 360B may be configured to define the chamber 371 through which air may be drawn through the wings 360A, 360B. The wings 360A, 360B may also be configured to be capable of being manipulated to adjust the shape of the reflector 334. For example, the width of the open end of the reflector 34 may widened or narrowed to customize the direction the heat from the elongated heat exchanger 30 is directed. Each of the wings 360A, 360B may comprise an extensions 302A, 302B that are connected to the wings 360A, 360B at an outward edge portion 304 of each of the wings 360A, 360B via a connector 308. The connectors 308 may comprise the same or similar interconnection as the wing/central mounting body 380 interface, however, it is also contemplated that other suitable devices may be utilized to attach the extension 302 to the wing 360. As illustrated in FIG. 11, the connectors 308 are the same configuration as the central mounting body 380 and are used in the same manner here, with the exception that the elongated slot and/or the slider nut are not present as they are not need in this application of the central mounting body 380. Fasteners 388 and 390 may similarly be used at intervals along the length of the interfaces between the connectors 308 and the wings 360A, 360B as well as the connectors 308 and the extensions 302A, 302B to hold the extensions 302A, 302B in place, although the fasteners are not limited to the same fastener, other than for convenience. This option may be user configurable and may be a multi-position chambered reflector. This construction may also be used with multi-diameter emitters in the same unit or in different units.

While not illustrated in the figures, it is contemplated that different shape extensions 302A, 302B may be utilized to customize the shaped of the reflector 334 to provide a particular directionality of the heat produced by the elongated heat exchanger 30. For example, as illustrated in FIG. 11 the extensions 302A, 302B comprise the same shape as the wings 360A, 360B, except the extensions have been 302A, 302B have been coupled the wings 360A, 360B so the curved inner surface of extensions 302A, 302B are directed outwardly from the elongated heat exchanger 30 creating a wider opening at the open end of the reflector 334. However, it is also contemplated that the extensions 302A, 302B may comprise a generally straight cross-section that when coupled to the wings 360A, 360B, extends the length of the wings 360A, 360B.

While not illustrated in FIG. 11, it is also contemplated that the extensions 302A, 302B may be coupled to the wings 360A, 360B in alternative orientations. For example, one or both of the extensions 302A, 302B may be coupled to the wings 360A, 360B such that the curved inner surface is directed toward the elongated heat exchanger 30 narrowing the focus of the heat path from the reflector 334 as desired. Extensions 302A, 302B are connected to the wings 360A, 360B at the outward edge portions 304 of the wings 360A, 360B via connectors 308.

Figure 13:
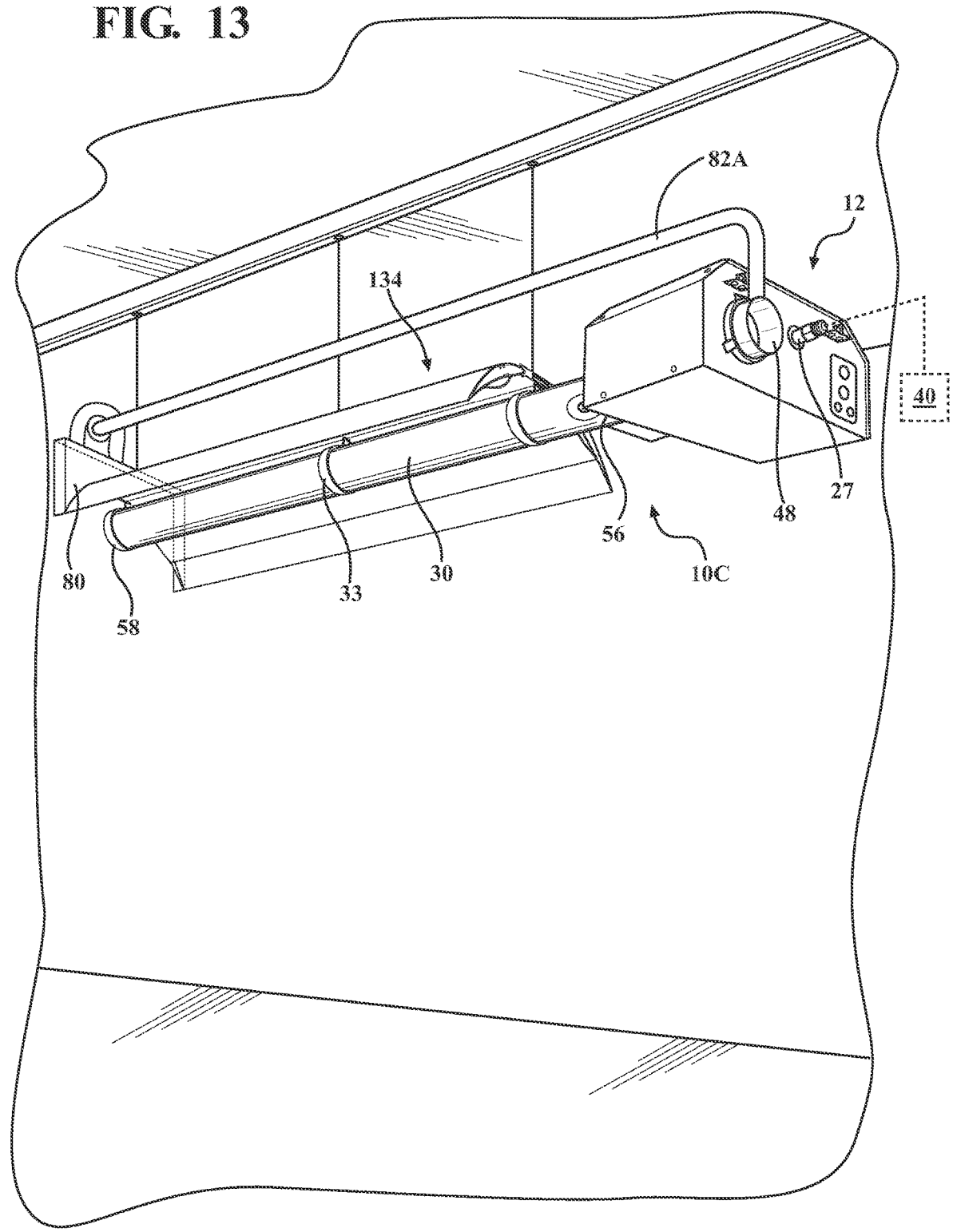
FIG. 13 is a perspective view of an alternative radiant heating assembly similar to FIG. 9, the radiant heating assembly a reflector, an air circulation pump, and a return air pipe for providing preheated air to the burner.
Figure 14:
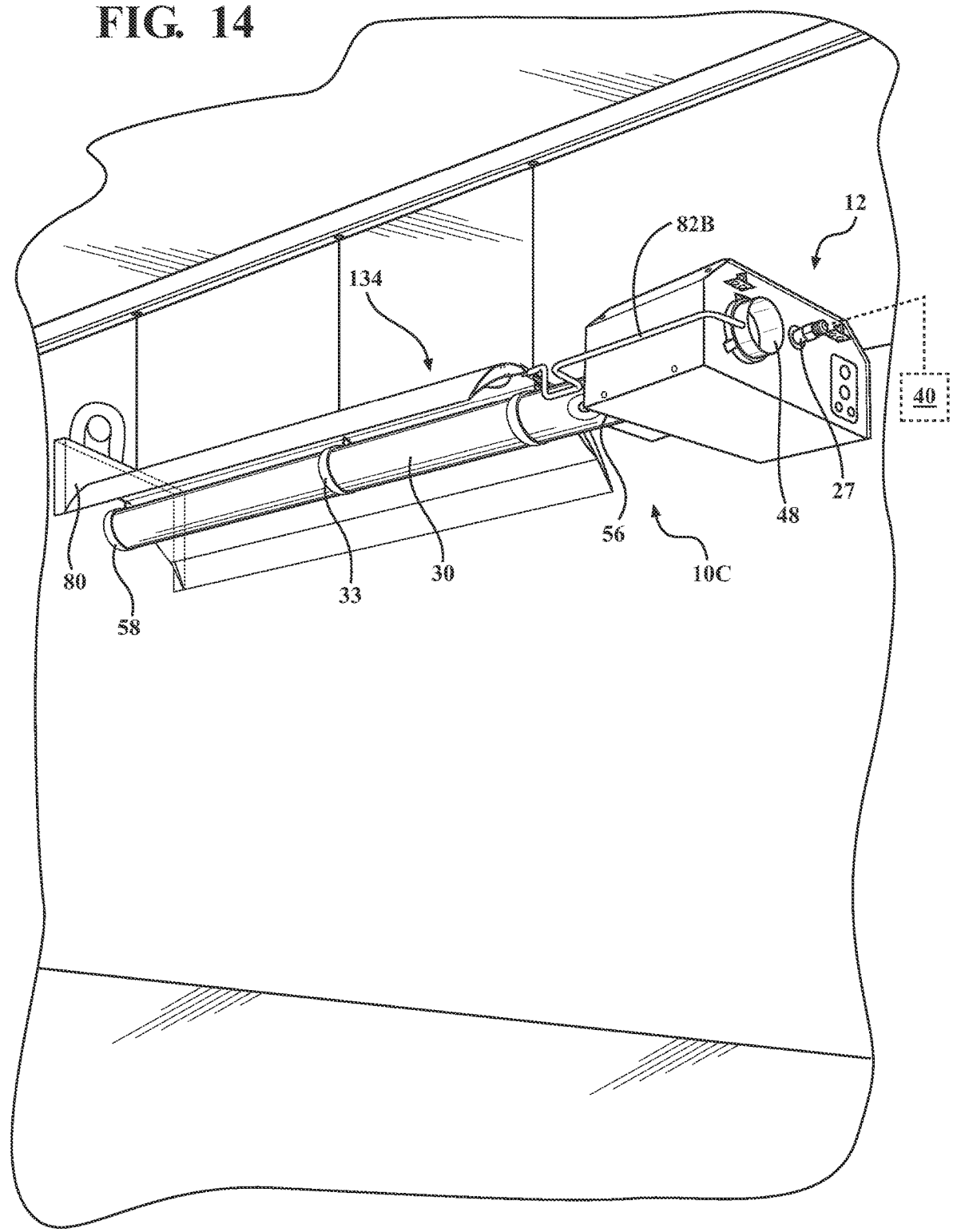
FIG. 14 is a perspective view of the radiant heating assembly of FIG. 13 including and alternative configuration of reflector, the air circulation pump, and the return air pipe for providing preheated air to the burner.

Referring to FIGS. 13 and 14, an exemplary radiant heating assembly 10C including a reflector 134 and an air circulation pump 80 is illustrated. As described above, the reflector 134, 234, 334 may be configured to define various air chambers 170, 172, 270, 271, 371. The various air chambers 170, 172, 270, 271, 371 may be configured to allow air to pass through them. As shown in FIG. 13 and, the air circulation pump 80 may attached to reflector 134, 234, 334 proximate the second end 58 of the heat exchanger 30 and configured to be in communication with the various air chambers 170, 172, 270, 271, 371 of the reflector 134, 234, 334. The air circulation pump 80 may be configured as a vacuum pump configured to draw air to the air circulation pump 80. Alternatively, the air circulation pump 80 may be configured as a fan configured to push air away from the air circulation pump. While not illustrated in the figures, it is also contemplated that the air circulation pump 80 may attached to reflector 134, 234, 334 proximate the first end 56 of the heat exchanger 30 and configured to be in communication with the various air chambers 170, 172, 270, 271, 371 of the reflector 134, 234, 334. In either configuration, the air circulation pump 80 is configured to circulate and/or move air through the various air chambers 170, 172, 270, 271, 371 of the reflector 134, 234, 334.

The radiant heating assembly 10C may further comprise an air return pipe 82A, 82B that is coupled to the air circulation pump 80 and the burner 24. Specifically, the air return pipe 82 may couple to the air circulation pump 80 to the air intake 48 of the burner 24 and configured to assist the air intake 48 with providing air to the burner 24. Referring to FIG. 13, the air return pipe 82A is configured to extend from the air circulation pump 80 to the air intake 48 of the burner 24. In operation, in this configuration, the air circulation pump 80 would be configured to draw air from various air chambers 170, 172, 270, 271, 371 of the reflector 134, 234, 334 toward the air circulation pump 80 and exhaust the air drawn from the various air chambers 170, 172, 270, 271, 371 of the reflector 134, 234, 334 to the air intake 48 of the burner 24. As the burner 24 heats the heat exchanger 30, some of the heat energy emitted from the heat exchanger 30 will interact with the reflector 134, 234, 334, and the components of the reflector 134, 234, 334, such as the central mounting body 164, 264, 364 and/or wings 160, 260, 360 that define the various air chambers 170, 172, 270, 271, 371 will be heated. The air drawn through the various air chambers 170, 172, 270, 271, 371 by the air circulation pump 80 will be heated as moves along the length of the various air chambers 170, 172, 270, 271, 371. That preheated air is them exhausted by the air circulation pump through the return air pipe 82A to air intake 48 of the burner 24. This preheated air at the air intake 48 will mix with other air from the environment pulled through the air intake and warmer the air to a level that is higher than the environment air temperature prior to the air entering the burner 24. This allows the burner 24 start with warmer air requiring less energy to heat it the defined temperature prior to exhausting it the heat exchanger 30 to heat the environment.

Alternatively, referring to FIG. 14, the air return pipe 82B is configured to extend from the various air chambers 170, 172, 270, 271, 371 of the reflector 134, 234, 334 to the air intake 48 of the burner 24. In operation, in this configuration, the air circulation pump 80 would be configured to draw air from the surrounding environment and force it through the various air chambers 170, 172, 270, 271, 371 of the reflector 134, 234, 334. The air circulation pump 80 would push the air from the environment toward the air circulation pump 80 the various air chambers 170, 172, 270, 271, 371 of the reflector 134, 234, 334, then through the air return pipe 82B to the air intake 48 of the burner 24. As described above, as the burner 24 heats the heat exchanger 30, some of the heat energy emitted from the heat exchanger 30 will interact with the reflector 134, 234, 334, and the components of the reflector 134, 234, 334, such as the central mounting body 164, 264, 364 and/or wings 160, 260, 360 that define the various air chambers 170, 172, 270, 271, 371 will be heated. The air drawn from the environment by the air circulation pump and then pushed through the various air chambers 170, 172, 270, 271, 371 will be heated as moves along the length of the various air chambers 170, 172, 270, 271, 371. That pre-heated air is them exhausted from the various air chambers 170, 172, 270, 271, 371 through the return air pipe 82B to air intake 48 of the burner 24. This preheated air at the air intake 48 will mix with other air from the environment pulled through the air intake and warmer the air to a level that is higher than the environment air temperature prior to the air entering the burner 24. This allows the burner 24 start with warmer air requiring less energy to heat it the defined temperature prior to exhausting it the heat exchanger 30 to heat the environment.

The process of using the air circulation pump to move air through the various air chambers 170, 172, 270, 271, 371 of the reflector 134, 234, 334 to send preheated air back into the air intake 48 of the unit 12 provides for added efficiencies and lower fuel consumption to heat to a defined temperature. The heat return pipe 82A, 82B send pre-heated air to the intake 48 to mix the preheated air with the air drawn through the intake 48. The heat return pipe 82A, 82B may be insulated to retain heat as it progresses back to the intake 48. While FIGS. 13 and 14 show exemplary configurations of radiant heating assembly 10C including an air return pipe 82A, 82B connected to one of the ends of the reflector 134, 234, 334, it is further contemplated that the air return pipe 82A, 82B may be connected to the various air chambers 170, 172, 270, 271, 371 of the reflector 134, 234, 334 at any point along the length of the reflector 134, 234, 334. It is also contemplated that multiple air return pipes 82 may be utilized. For example, a first heating pipe 82 may be coupled to the first air chamber 270, and a second heating pipe 82 may be coupled to a second air chambers 271. If there are multiple air return pipes, they may all converge at the air intake to provide pre-heated air to the burner 24.

Referring to FIGS. 15 to 18, a fourth configuration of a reflector 434 that may be utilized as part of any of the radiant heating assemblies 10 described above, specifically, the radiant heating assemblies 10C including an air circulation pump 80. The reflector 434 may comprise a pair of wings 460A, 460B extending from a central body 464, which engages the elongated heat exchanger 30 of the radiant heating assembly 10 at spaced apart locations. The central body 464 may define a central air chamber 471 configured to allow air to be drawn through the central body 464 and heated by the heat exchanger in the manner described above. Each of the wings has an inner surface 466 and an outer surface 468 formed to define one or more air chambers 470 in each of the wings 460A, 460B, than air chamber configured to allow air to be drawn through the wings 460A, 460B. Similar to as is described above, the reflector may be configured such that air may be drawn through the central air chamber 471 defined by the central body 464 and/or the chamber(s) 470 defined by the wings 460A, 460B by the air circulation pump 80. The collected air may then be passed along to the air intake 48 through the air return pipe 82A, 82B to provide preheated air to the air intake 48 to warm the air prior to entering the burner 24. Similar to as described above, the air circulation pump 80 may be connected to either end of the reflector 434, and the return air pipe 82A, 82B may be connected to the air circulation pump 80 and/or the directly the air chambers 470, 471 in any similar manner as is described above.

As illustrated in FIGS. 15 to 18, the central mounting body 464 defines a three-point central mounting body 464 configured to assemble and mount the reflector wings 460A, 460B to and to couple the reflector 434 to the elongated heat exchanger 30. The central mounting body 464 has a mounting portion 484 that is configured to mate with an end portion 486 of each wing 460A, 460B to hold each of the wings 460A, 460B in place on the central mounting body 464. As illustrated in FIGS. 15 to 18, the mounting portion 484 of the central mounting body 464 may define a slot, track, or similar mounting feature configured engage a corresponding tab or coupling feature defined by the end portion 486 of each wing 460A, 460B to couple the central mounting body 464 to each wing 460A, 460B. While not illustrated in the figures, other means may be utilized for attaching each wing 460A, 460B to the central mounting body 464. For example, as is described above, fasteners such as a bolt and nut may be utilized. The fasteners may be spaced along the length of the wings 460A, 460B and central mounting body 464 to hold the parts together in a preselected position, although it is anticipated that adjustment can be made as needed to attain the proper heat deflection of the reflector wings 460A, 460B.

The wings 460A, 460B may also be configured to be capable of being manipulated to adjust the shape of the reflector 434. For example, the width of the open end of the reflector 434 may widened or narrowed to customize the direction the heat from the elongated heat exchanger 30 is directed.

Figure 15:
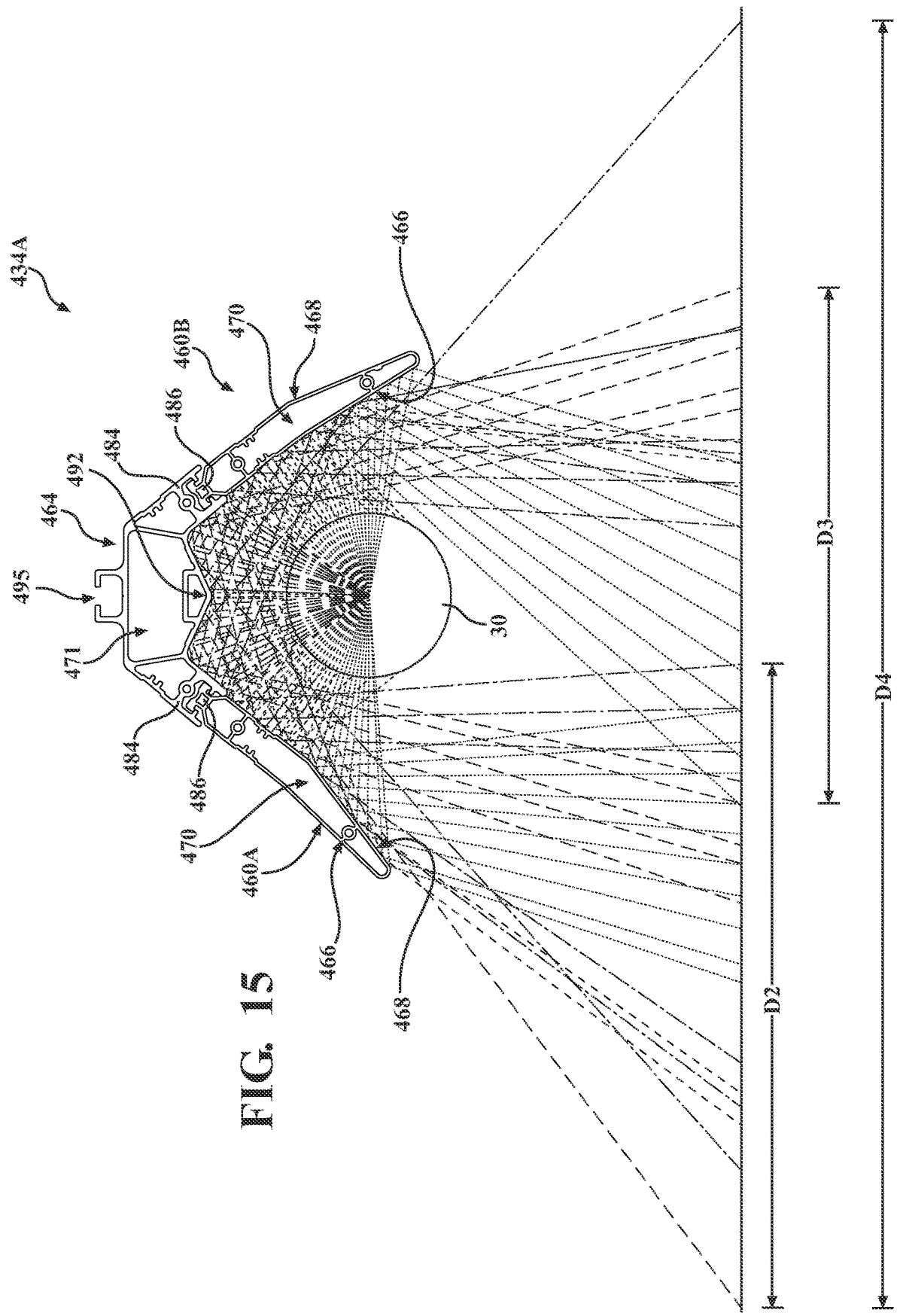
FIG. 15 is a cross-sectional view of an alternative configuration of a reflector for use with the radiant heating assembly of FIG. 9, 13, or 14, the reflector including wings arranged in a first configuration.

Referring to FIG. 15, an exemplary arrangement of wings 460A, 460B of the fourth configuration of the reflector 434A is illustrated showing the resulting heat dispersion. For example, in FIG. 15 a first wing 460A is coupled to the central body 464 such that the wing 460A is projecting away from the heat exchanger 30. The wing 460A is coupled to the central body 464 so that the outer surface 468 of the wing 460A is disposed closer to the heat exchanger 30 and the opposing inner surface 466 of the wing is disposed away from the heat exchanger 30. A second wing 460B may be coupled to the central body 464 such that the wing 460B is projecting toward the heat exchanger 30. The wing 460B is coupled to the central body 464 so that the inner surface 466 of the wing 460B is disposed closer to the heat exchanger 30 and the opposing outer surface 468 of the wing 460B is disposed away from the heat exchanger 30. Arranging the wings 460A, 460B of the reflector 434A in this manner results in the heat dispersed from the heat exchanger being more concentrated directly below the heat exchanger and toward the first wing 460A side of the heat exchanger. As can be seen in FIG. 15, because of the orientation of the first wing 460A the heat energy reflected by the first wing 460A may be directed generally downward and outward from the first wing 460A, with the heat being dispersed over a distance D2. By contrast, the orientation of the second wing 460B the heat energy reflected by the second wing 460B may be directed generally downward and toward the first wing 460A, with the heat being dispersed over a distance D3. The distance D2 is generally greater than the distance D3. This may be a helpful configuration if the second wing side of the radiant heating assembly 10 is near a wall, allowing the heat energy produced by the heat exchanger 30 to be directed away from the wall and more toward the center of the room or area to be heated.

While not shown in the Figures, it is contemplated that the both wings 460 of the reflector 434 may be with coupled to the central body 464 so that the outer surface 468 of the wing 460 is disposed closer to the heat exchanger 30 and the opposing inner surface 466 of the wing is disposed away from the heat exchanger 30. In this configuration, a wider heat spread would be created by the reflector. For example, the wider heat spread spanning a distance D2 shown on the first wing 460A side in FIG. 15 would be mirrored on the second wing 460B creating a wider general heat spread if both wings 460 were coupled to the central body 464 so that the both wings curve outwardly away from the heat exchanger 30.

Figure 16:
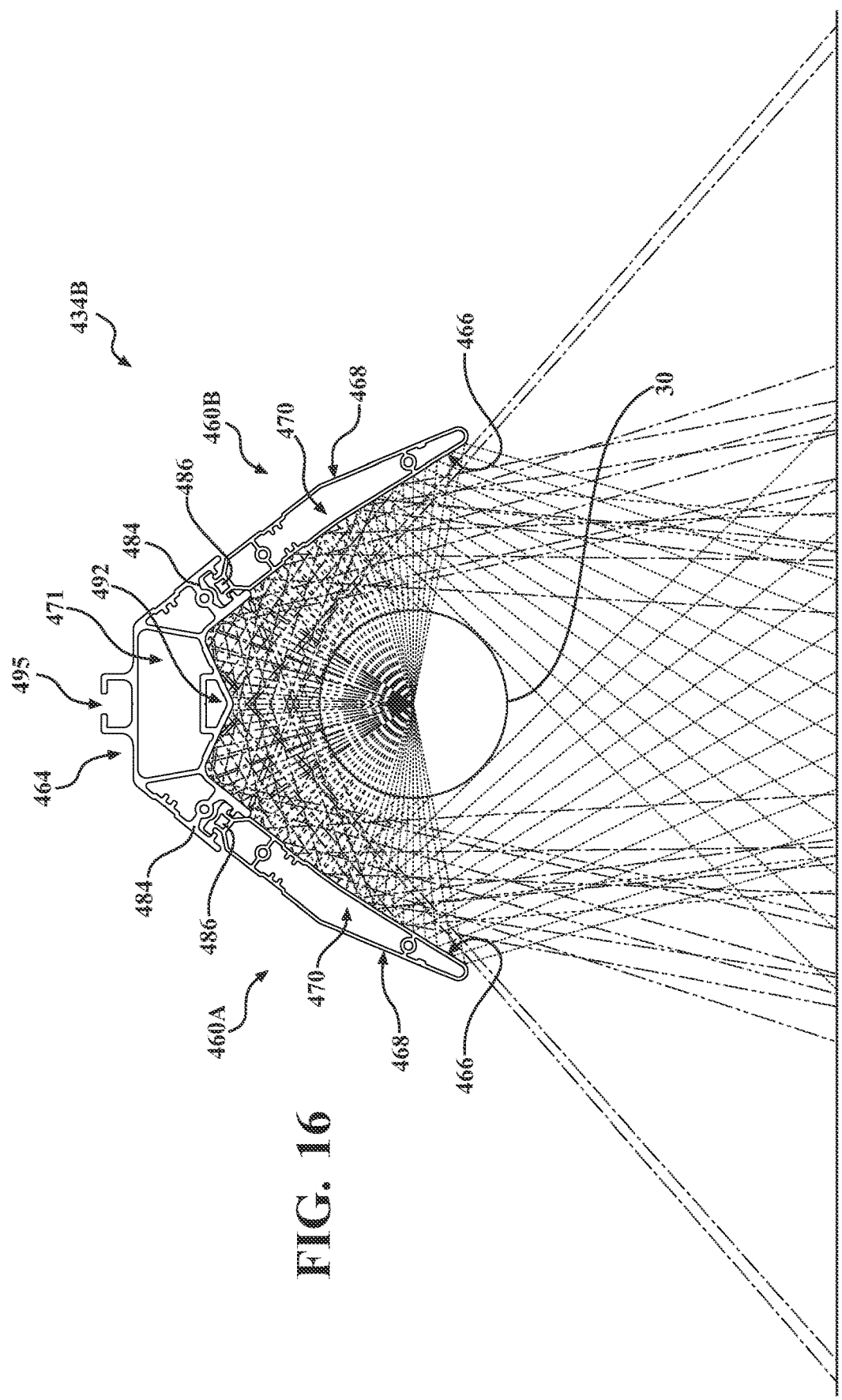
FIG. 16 is a cross-sectional view of the reflector of FIG. 15 with the wings arranged in a second configuration.

Referring to FIG. 16, an exemplary arrangement of wings 460A, 460B of the fourth configuration of the reflector 434B is illustrated showing the resulting heat dispersion. For example, in FIG. 16 the first and second wings 460A, 460B may both be coupled to the central body 464 such that the wings 460A, 460B are both projecting toward the heat exchanger 30. The wings 460A, 460B are coupled to the central body 464 so that the inner surface 466 of the wings 460A, 460B is disposed closer to the heat exchanger 30 and the opposing outer surface 468 of the wings 460A, 460B is disposed away from the heat exchanger 30. The elongated slot 492 of the reflector 434B in FIG. 16 is generally shaped like of "V". Furthermore, the inner surface 466 of the wings 460A, 460B are generally smooth and/or flat. The wings 460A, 460B may be coupled to the central body 464 so that the inner surface 466 of the wings 460A, 460B is disposed closer to the heat exchanger 30 and the opposing outer surface 468 of the wings 460A, 460B is disposed away from the heat exchanger 30. Arranging the wings 460A, 460B of the reflector 434C in this manner with the central body illustrated in FIG. 16 results in the heat dispersed from the heat exchanger 30 being more evenly distributed below the heat exchanger 30. The greatest amount of heat energy is still generally directed below the heat exchanger 390 being focused directly below the heat exchanger 30. As can be seen in FIG. 16, because of the orientation of the wings 460A, 460B create symmetrical heating profiles below the heat exchanger 30. This arrangement may again be a helpful if the radiant heat assembly 10 is placed in a more central location of the room or area to be heated.

Referring to FIG. 17, an exemplary arrangement of wings 460A, 460B of the fourth configuration of the reflector 434C is illustrated showing the resulting heat dispersion. For example, in FIG. 17 the first and second wings 460A, 460B may both be coupled to the central body 464 such that the wings 460A, 460B are both projecting toward the heat exchanger 30 as described above with regard to FIG. 16. However, the inner surface 466 of the wings 460A, 460B and the shape of the central body 464 of the reflector 434C illustrated in FIG. 17 is different from the reflector 434B in FIG. 16. Specifically, the elongate slot 492 in the central body 464 is shaped differently. As oppose to the V-shaped surface of the elongated slot 492 of the reflector 434B in FIG. 16, the elongated slot 492 of the reflector 434C in FIG. 17 includes a W-shaped surface. Furthermore, the inner surface 466 of the wings 460A, 460B of the reflector 434C are multifaceted creating additional surface area on the inner surface 466 of the wings 460A, 460B and creating a denser pattern of reflected heat energy from the heat exchanger 30 directly below the radiant heating assembly 10. Arranging the wings 460A, 460B of the reflector 434B in this manner results in the heat dispersed from the heat exchanger 30 being more evenly distributed below the heat exchanger 30, with the greatest amount of heat energy being focused directly below the heat exchanger 30. As can be seen in FIG. 17, because of the orientation of the wings 460A, 460B and the multifaceted inner surface 466 of wings 460A, 460B, generally symmetrical heating profile is created below the heat exchanger 30. The heat reflected by each of the wings 460A, 460B is generally dispersed over a distance D6 and D7, wherein the distance D6 and the distance D7 are generally equal. This may be a helpful if the radiant heat assembly is placed in a more central location of the room or area to be heated. It can also be helpful for heating a specific area directly below the heater exchanger 30.

As described above, the inner surfaces 466 of the wings 460A, 460B of the reflectors 434B, 434C illustrated in FIGS. 16 and 17 are different. Specifically, the inner surfaces 466 of the wings 460A, 460B of the reflectors 434C include grooves that run the length of the wings 460A, 460B to define a multi-faceted surface. By contrast, the inner surfaces 466 of the wings 460A, 460B of the reflectors 434B are generally flat. Referring to FIG. 18, a representation of the heat dispersion created only by the multifaceted components of the inner surface 466 of the reflector 434C is illustrated. This shows the additional heat dispersion pattern that is created by the multifaceted components of the inner surface 466 of the reflector 434C of FIG. 17 compared to the flat inner surface 466 of the reflector 434C of FIG. 17. These additional reflection angles are created by adding the multifaceted components to the inner surface 466 of the reflector 434C.

While not illustrated in the Figures, it is further contemplated that each of the wings 460A, 460B may comprise an extensions that are connected to the wings 460A, 460B at an distal edge portion of each of the wings 460A, 460B that is opposite the central mounting body 464 via a connector. As Similar to as is described in FIG. 11 above, the connectors may comprise a fastener or similar interconnection configured to attach the extension to the wing 460.

Clauses directed to alternative configurations:
I. A radiant heating assembly comprising:
   a fuel valve;
   a blower;
   a controller configured to control the fuel valve and the blower; and
   a heat exchanger or burner tube configured to have a reflector, said reflector having insulation between the inner and outer surfaces of the reflector in chambers
II. A radiant heating assembly in accordance with Clause I, wherein the insulation layer is air for the passage of air between the inner and outer surfaces.
III. A radiant heating assembly in accordance with Clause II, wherein the air flows through the chambers of the reflector.
IV. A radiant heating assembly in accordance with Clause I, wherein the reflector includes additional elements for reflecting heat along the inner reflector surface.
V. A radiant heating assembly in accordance with Clause I, wherein the reflector includes extensions
VI. A radiant heating assembly in accordance with Clause IV, wherein the additional elements include air chambers for the passage of air.
VII. A radiant heating assembly in accordance with Clause IV, further comprising a device for moving air through the chambers.
VIII. A radiant heating assembly comprising:
   a burner for receiving air and fuel, and for combustion and emitting heated exhaust;
   an elongated heat exchanger in fluid communication with said burner defining a first end and a second end and a length between said first and second ends, said elongated heat exchanger comprising:
      an outer tube disposed along at least a portion of said length and defining an interior;
      an inner tube disposed within said interior along at least a portion of said length and defining an inner chamber for receiving the heated exhaust from the burner; and
      fins disposed between said inner tube and said outer tube for spacing said liner tube from said outer tube along at least a portion of said length to create chambers along the length of the tube having the fins.
IX. A radiant heating assembly in accordance with clause VIII, wherein said fins are integral with an end section of said outer tube.
X. A radiant heating assembly in accordance with clause IX, wherein said fins are integral with both the inner tube and the outer tube.
XI. A radiant heating assembly in accordance with clause VIII, wherein said outer tube has linear beads on its outer surface.
XII. A radiant heating assembly in accordance with clause VIII, wherein said liner tube and said outer tube are comprised of different metallic materials.
XIII A radiant heating assembly in accordance with clause VIII, wherein one of said materials is extruded aluminum.
XIV. A radiant heating assembly in accordance with clause VIII, wherein one of said materials is aluminized steel.
XV. A radiant heating assembly in accordance with clause VIII, wherein said inner tube defines a first surface facing said outer tube and said outer tube defines a second surface facing away from said inner tube, said first surface having a first surface temperature and said second surface having a second surface temperature lower than said first surface temperature.
XVI. A radiant heating assembly in accordance with clause VIII, further including a plurality of spacing fins.
XVII. A radiant heating assembly in accordance with clause XVI, wherein said plurality of spacing fins are radially disposed about and coupled to said outer tube.
XVIII. A radiant heating assembly in accordance with clause XVI, wherein said plurality of spacing elements define angles between adjacent spacing elements, with said axis being a vertex for each angle, said plurality of spacing elements are radially disposed about said liner tube such that angles between said plurality of spacing elements are equal.
XIX. A radiant heating assembly in accordance with clause XVI, wherein said plurality of spacing elements define angles between adjacent spacing elements, with said axis being a vertex for each angle, said plurality of spacing elements are radially disposed about said liner tube such that angles between said plurality of spacing elements are unequal.
XX. A radiant heating assembly comprising a burner tube and a reflector, said reflector having elements that are adjustable in assembly on site to define various configurations of the reflector.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed:
1. A radiant heating assembly comprising:
   a heating unit comprising:
      a burner;
      an air intake in communication with the burner and configured to provide air from an air source to the burner for combustion;
      a fuel inlet in communication with the burner and configured to provide fuel to the burner for combustion;
      a fuel valve disposed within the fuel inlet and configured to control amount of fuel provided to the burner through the fuel inlet; and
   a controller configured to control the fuel valve;
   a heat exchanger coupled to the burner of the heating unit;
   a reflector coupled to and at least partially disposed about the heat exchanger, the reflector configured to reflect the heat energy produced by the heat exchanger in a defined direction, the reflector comprising:
      a base defining an air chamber; and
   an air circulation pump in communication with the air chamber defined in the base of the reflector and configured to move air through the air chamber and supply the air that has passed through the air chamber to the air intake as a second air source;
   wherein the base is configured to absorb some of the heat energy produced by the heat exchanger such that as the air passes through the air chamber of the base, the air is heated above the air temperature of the surrounding environment, and when the heated air from the air chamber is provided to the air intake, it increases the temperature of the air provided by the air intake to the burner.

2. The radiant heating assembly of claim 1, wherein the base further comprises a mounting portion.

3. The radiant heating assembly of claim 2, wherein the reflector further comprises a wing comprising an end portion configured to removably couple with the mounting portion of the base.

4. The radiant heating assembly of claim 3, wherein the wing further comprises an inner surface and an outer surface that define a wing air chamber; and
wherein the air circulation pump is in communication with the wing air chamber and is configured to move air through the wing air chamber and supply the pre-heated air that has passed through the wing air chamber to the air intake to increase the temperature of the air provided by the air intake to the burner for combustion.

5. The radiant heating assembly of claim 3, wherein the wing comprises a curved profile; and
wherein the mounting portion of the base and the end portion of the wing are configured such that the wing may be attached the base in one of:
a first configuration where the wing is curved toward the heat exchanger, or
a second configuration where the wing is curved away from the heat exchanger.

6. The radiant heating assembly of claim 3, wherein the wing comprises a distal end opposite the end portion; and
wherein the reflector further comprises an extension that is removably coupled to the distal end of the wing.

7. The radiant heating assembly of claim 6, wherein the extension defines an extension air chamber; and
wherein the air circulation pump is in communication with the extension air chamber and is configured to move air through the extension air chamber and supply the pre-heated air that has passed through the extension air chamber to the air intake to increase the temperature of the air provided by the air intake to the burner for combustion.

8. The radiant heating assembly of claim 3,
wherein the wing comprises a first wing and a second wing, each of the first and second wing having a curved profile; and
wherein at least one of the first wing is mounted to the base in a first orientation where the first wing is curved toward the heat exchanger, and the second wing is mounted to the base in a second orientation where the second wing is curved away from the heat exchanger.

9. The radiant heating assembly of claim 3, wherein the wing comprises an inner surface directed toward the heat exchanger, the inner surface comprising one or more grooves to define a multifaceted surface.

10. The radiant heating assembly of claim 1, wherein the base defines an elongated track that extends the length of the base;
wherein the heat exchanger is mounted to the base by a sleeve that is removably coupled to the elongated track; and
wherein the elongated track is configured such that the sleeve may be coupled to the base at any point along the length of the base.

11. A radiant heating assembly comprising:
a burner configured to receive air from an air source;
a heat exchanger coupled to the burner;
a reflector coupled to and at least partially disposed about the heat exchanger, the reflector configured to reflect the heat energy produced by the heat exchanger in a defined direction, the reflector comprising a base defining an air chamber; and
an air circulation pump coupled to an end of the base and in communication with the air chamber defined by the base, the air circulation pump configured to move air through the air chamber and supply air that has passed through the air chamber to the burner as a second air source.

12. The radiant heating assembly of claim 11, wherein the base further comprises a mounting portion.

13. The radiant heating assembly of claim 12, wherein the reflector further comprises a wing comprising an end portion configured to removably couple with the mounting portion of the base.

14. The radiant heating assembly of claim 13, wherein the wing further comprises an inner surface and an outer surface that define a wing air chamber; and
wherein the air circulation pump is in communication with the wing air chamber and is configured to move air through the wing air chamber and supply air that has passed through the wing air chamber to the burner to increase the temperature of the air provided to the burner for combustion.

15. The radiant heating assembly of claim 13, wherein the wing comprises a curved profile; and
wherein the mounting portion of the base and the end portion of the wing are configured such that the wing may be attached to the base in one of:
a first configuration where the wing is curved toward the heat exchanger, or
a second configuration where the wing is curved away from the heat exchanger.

16. The radiant heating assembly of claim 13, wherein the wing comprises a distal end opposite the end portion; and
wherein the reflector further comprises an extension that is removably coupled to the distal end of the wing.

17. The radiant heating assembly of claim 16, wherein the extension defines an extension air chamber; and
wherein the air circulation pump is in communication with the extension air chamber and is configured to move air through the extension air chamber and supply air that has passed through the extension air chamber to the burner to increase the temperature of the air provided to the burner for combustion.

18. A method of operating a radiant heating assembly, the radiant heating assembly comprising a burner for heating a heat exchanger and a reflector defining an air chamber, the method comprising:
heating the heat exchanger with the burner through air provided to the burner from an air source;
redirecting the heat energy produced by the heat exchanger using the reflector;
the reflector absorbing a portion of the heat energy produced by the heat exchanger;
warming the air disposed in the air chamber; and
drawing the warmed air from the air chamber of the reflector and providing it to the burner as a second air source to improve the efficiency of the burner by increasing the temperature of the air utilized by the burner during combustion.

19. The method of claim 18, wherein the step of drawing the warmed air from the air chamber of the reflector comprises vacuuming air from air chamber and pumping it to the burner.

20. The method of claim 18, wherein the step of drawing the warmed air from the air chamber of the reflector comprises vacuuming air from the surrounding environment and pumping it through the air chamber and into the burner.

21. A radiant heating assembly comprising:
a heating unit comprising:
  a burner;
  an air intake in communication with the burner and configured to provide air to the burner for combustion;
  a fuel inlet in communication with the burner and configured to provide fuel to the burner for combustion;
  a fuel valve disposed within the fuel inlet and configured to control amount of fuel provided to the burner through the fuel inlet; and
  a controller configured to control the fuel valve;
a heat exchanger coupled to the burner of the heating unit;
a reflector coupled to and at least partially disposed about the heat exchanger, the reflector configured to reflect the heat energy produced by the heat exchanger in a defined direction, the reflector comprising:
  a base defining an air chamber; and
  an air circulation pump in communication with the air chamber defined in the base of the reflector and configured to move air through the air chamber and supply the air that has passed through the air chamber to the air intake;
wherein the base is configured to absorb some of the heat energy produced by the heat exchanger such that as the air passes through the air chamber of the base, the air is heated above the air temperature of the surrounding environment, and when the heated air from the air chamber is provided to the air intake, it increases the temperature of the air provided by the air intake to the burner; and
further comprising an air return pipe configured to deliver the heated air from the air chamber to the air intake.

* * * * *